United States Patent
Upadhyay et al.

(10) Patent No.: US 12,314,825 B2
(45) Date of Patent: May 27, 2025

(54) PROMPT ROUTING SYSTEM AND METHOD

(71) Applicant: Martian Learning, Inc., North Potomac, MD (US)

(72) Inventors: Shriyash K. Upadhyay, North Potomac, MD (US); Etan J. Ginsberg, North Potomac, MD (US); Dory Zidon, North Potomac, MD (US); Luka Samkharadze, North Potomac, MD (US)

(73) Assignee: Martian Learning, Inc., North Potomac, MD (US)

( * ) Notice: Subject to any disclaimer, the term of this patent is extended or adjusted under 35 U.S.C. 154(b) by 0 days.

(21) Appl. No.: 18/800,900

(22) Filed: Aug. 12, 2024

(65) Prior Publication Data

US 2025/0053876 A1     Feb. 13, 2025

Related U.S. Application Data

(60) Provisional application No. 63/532,199, filed on Aug. 11, 2023, provisional application No. 63/588,591, filed on Oct. 6, 2023, provisional application No. 63/598,879, filed on Nov. 14, 2023.

(51) Int. Cl.
  *G06N 20/00* (2019.01)
(52) U.S. Cl.
  CPC .................... *G06N 20/00* (2019.01)
(58) Field of Classification Search
  CPC ............... G06N 20/00; G06N 3/006
  See application file for complete search history.

(56) References Cited

U.S. PATENT DOCUMENTS

| | | | |
|---|---|---|---|
| 2020/0202256 A1* | 6/2020 | Chaudhari | G06F 18/23 |
| 2020/0380418 A1* | 12/2020 | Strope | G06F 16/3329 |
| 2021/0150155 A1* | 5/2021 | Kim | H04L 51/02 |
| 2021/0209412 A1* | 7/2021 | Quader | G06F 18/214 |
| 2022/0318689 A1* | 10/2022 | Li-Bland | G06N 20/00 |
| 2022/0400159 A1 | 12/2022 | Chi et al. | |
| 2023/0222344 A1* | 7/2023 | Chai | G06N 3/045 706/15 |
| 2024/0273345 A1* | 8/2024 | Bharadwaj | G06N 3/045 |

FOREIGN PATENT DOCUMENTS

| | | | | |
|---|---|---|---|---|
| CN | 116226334 A | * | 6/2023 | G06F 16/3344 |

OTHER PUBLICATIONS

Bai, Yuntao, et al., "Constitutional AI: Harmlessness from AI Feedback", arXiv:2212.08073, https://arxiv.org/abs/2212.08073, Dec. 15, 2022.

(Continued)

*Primary Examiner* — Dave Misir
(74) *Attorney, Agent, or Firm* — Jeffrey Schox; Diana Lin

(57) ABSTRACT

In variants, the method can include determining training data, determining a router, and using the router. In variants, using the router can include receiving a runtime prompt, predicting performance scores for the runtime prompt for each of a set of candidate models, optionally predicting operational metrics for responding to the runtime prompt for each of the set of candidate models, selecting a candidate model based on the predicted performance scores and optionally the predicted operational metrics, and optionally determining a response based on the runtime prompt.

20 Claims, 15 Drawing Sheets

(56) References Cited

OTHER PUBLICATIONS

Chen, Lingjiao, et al., "FrugalGPT: How to Use Large Language Models While Reducing Cost and Improving Performance", arXiv:2305.05176, https://arxiv.org/abs/2305.05176, May 9, 2023.
Ding, Dujian, et al., "Hybrid LLM: Cost-Efficient and Quality-Aware Query Routing", International Conference on Learning Representations, Apr. 22, 2024.
Kag, Anil, et al., "Efficient Edge Inference by Selective Query", International Conference on Learning Representations, published May 1, 2023.
Lu, Keming, et al., "Routing to the Expert: Efficient Reward-guided Ensemble of Large Language Models", arXiv:2311.08692, https://arxiv.org/abs/2311.08692, Nov. 25, 2023.
Ouyang, Long, et al., "Training language models to follow instructions with human feedback", arXiv:2203.02155, https://arxiv.org/abs/2203.02155, Mar. 4, 2022.
Šakota, Marija, et al., "Fly-Swat or Cannon? Cost-Effective Language Model Choice via Meta-Modeling", arXiv:2308.06077, https://arxiv.org/abs/2308.06077, Aug. 11, 2023.
Shazeer, Noam, et al., "Outrageously Large Neural Networks: the Sparsely-Gated Mixture-of-Experts Layer", arXiv:1701.06538, https://arxiv.org/abs/1701.06538, Jan. 23, 2017.
Wang, Yiding, et al., "Tabi: An Efficient Multi-Level Inference System for Large Language Models", EuroSys '23: Proceedings of the Eighteenth European Conference on Computer Systems, pp. 233-248, https://doi.org/10.1145/3552326.3587438, May 8, 2023.
Zhao, Xu, et al., "Automatic Model Selection with Large Language Models for Reasoning", arXiv:2305.14333, https://arxiv.org/abs/2305.14333, May 23, 2023.

\* cited by examiner

PROMPT ROUTING SYSTEM AND METHOD

CROSS-REFERENCE TO RELATED APPLICATIONS

This application claims the benefit of U.S. Provisional Application No. 63/532,199 filed 11 Aug. 2023, U.S. Provisional Application No. 63/588,591 filed 6 Oct. 2023, and U.S. Provisional Application No. 63/598,879 filed 14 Nov. 2023, each of which is incorporated in its entirety by this reference.

TECHNICAL FIELD

This invention relates generally to the machine learning field, and more specifically to a new and useful model in the machine learning field.

BACKGROUND

With the rapidly growing number of foundation models available to users, selecting the best foundation model to route a given prompt to has become increasingly difficult. This is an incredibly difficult problem, because different foundation models have different capabilities, will generate different-quality responses for seemingly similar prompts, and are black-box systems, so typical programmatic characterization techniques cannot be used for foundation model selection.

Thus, there is a need in the foundation model field to create a new and useful prompt routing system and method.

DETAILED DESCRIPTION

The following description of the embodiments of the invention is not intended to limit the invention to these embodiments, but rather to enable any person skilled in the art to make and use this invention.

1. Overview

Figure 1:
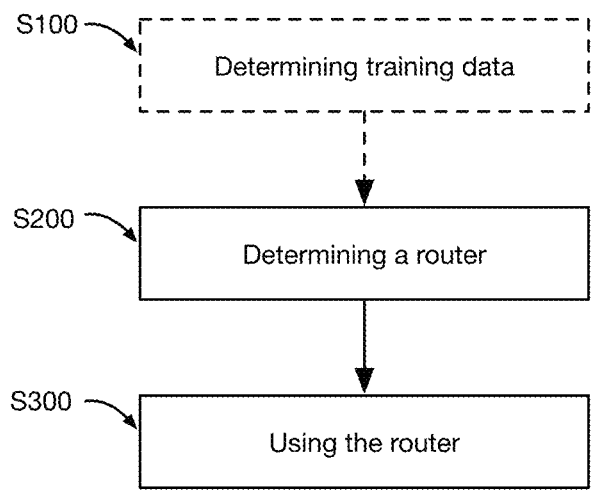
FIG. 1 is a schematic representation of a variant of the method.
Figure 3:
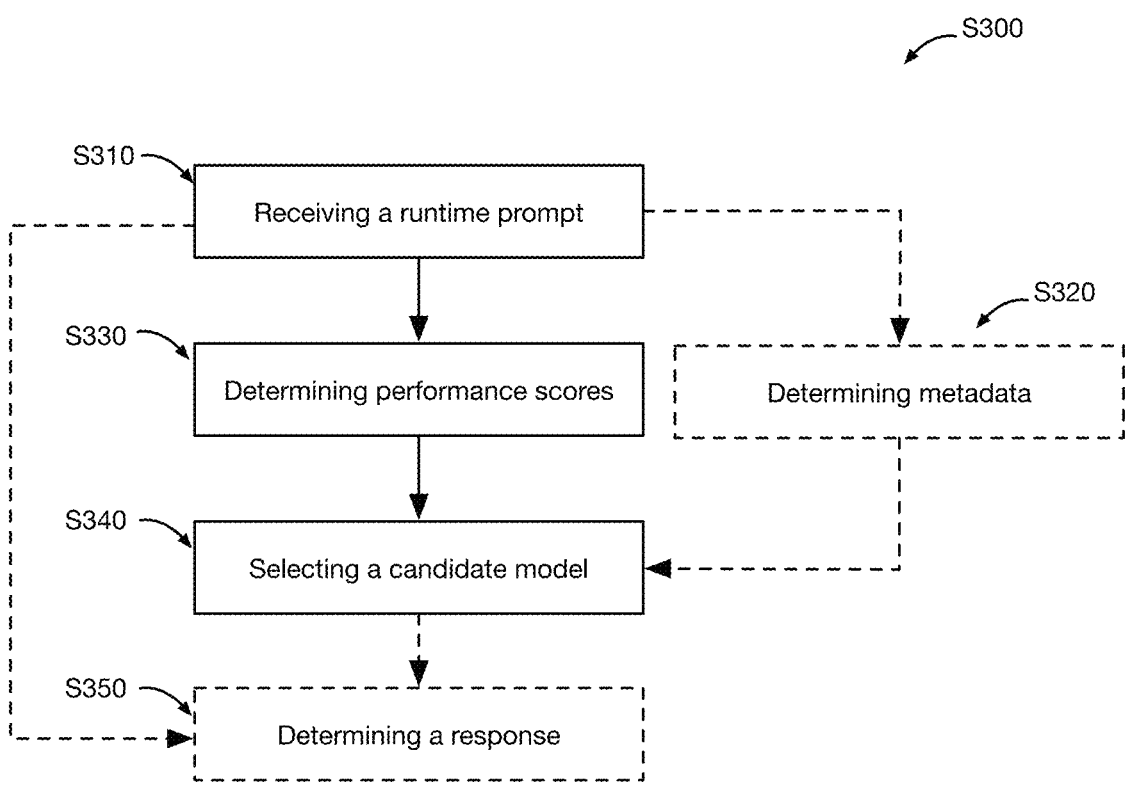
FIG. 3 is a schematic representation of a variant of S300.

In variants, as shown in FIG. 1, the method can include determining training data S100, determining a router S200, and using the router S300. In variants, as shown in FIG. 3, using the router S300 can include receiving a runtime prompt S310, optionally determining metadata S320 for the prompt, determining performance scores S330 for the runtime prompt, selecting a candidate model S340 based on the performance scores, and optionally determining a response S350 for the runtime prompt using the selected candidate model. The method can function to select the best model (e.g., transformer, large language model, etc.) to use for a given prompt, wherein the selected model 210 is then used to determine a response to the prompt. The method can additionally or alternatively function to generate a router 100 (e.g., using a score prediction architecture or a similarity architecture) that is configured to select the best model for a given prompt.

In an illustrative example, the prompt routing method can include: receiving a runtime prompt; predicting a performance score for each of a set of candidate models, based on the prompt, using a trained routing model; optionally determining other metadata (e.g., cost, latency, etc.) for running the prompt through each candidate model; and selecting a candidate model for the prompt based on the respective performance score, optionally the metadata, and selection parameter values (e.g., a set of user preferences or other selection rule). The runtime prompt can then be run through the selected model 210. In variants, the routing model can be trained on a set of training prompt-target performance score pairs, wherein the target performance scores can be determined by running the training prompt through each candidate model, then scoring the candidate model's response (e.g., deriving a score from a ranking, manually scoring the model output, predicting a score given the prompt and model output using a trained reward model 300, etc.) to determine the model's performance score for the training prompt. In variants, the routing model used during runtime is selected from a set of candidate routing models, wherein the candidate routing models can: have different model architectures, be trained using different hyperparameters, be trained using different training data, be trained using different training methods, or otherwise differ. In examples, the routing model can be selected (e.g., for all domains, a given domain, etc.) based on the respective area under a cost-performance curve (e.g., Average Improvement in Quality; AIQ). In variants, new models can be added to the router 100 by retraining the router 100 using new training data for the new model (e.g., new training prompt-target performance score pairs), by adding and training a new classification or scoring head to the router 100 (e.g., while preserving the pretrained encoding layers; using the prompt encoding output by the pretrained intermediate layers; etc.), and/or otherwise added to the router 100.

However, the method can be otherwise performed.

2. Technical Advantages

Variants of the technology can confer one or more advantages over conventional technologies.

First, a runtime prompt can be routed to an optimal model without running the runtime prompt through any of the candidate models 200 and/or without preclassifying the runtime prompt. Routing without running the runtime prompt through any of the candidate models 200 saves both time and money. For example, the prompt can be routed without waiting for each model to receive the prompt, process the prompt, and return a response. In another example, users only need to pay for running the prompt on a single model, instead of running the prompt on multiple models Furthermore, routing without running the prompt through any of the candidate models 200 enables routing complexity of O(1), enabling the router 100 to consider many more models and variations of models than conventional "cascading" prompt routing methods.

Second, the method can enable unexperienced users (e.g., users without a comprehensive knowledge of the advantages and disadvantages of different candidate models 200, users without sufficient domain expertise to evaluate the quality of a response, users without the skill to access multiple models in a programmatic and/or scalable manner, etc.) to still receive a high-quality response to a given query. In variants, the method can enable this by dynamically routing prompts between different models. For example, the method enables the prompt to be routed to the best model for a given prompt (e.g., the model anticipated to have the highest performance, given user-provided metadata constraints). Since different models have different strengths and weaknesses (e.g., for different domains, different prompt modalities, different prompt construction, etc.), this enables the method to "beat" individual models on performance. Third, multi-variate (e.g., multi-score) routing enables complex router decision making, wherein metrics like cost and accuracy are not the only metrics being considered when selecting a candidate model—the router 100 can additionally optimize for other parameters like latency, tone, domain knowledge, and/or other suitable operational characteristics and/or parameters. Multi-variate routing enables customers to tune the router 100 for customer-specific needs and/or prompt parameters (e.g., dialect, tone, comprehension level, etc.).

Fourth, in variants where a similarity model 112 is used to determine a selected model 210, the router 100 can successfully route a prompt without knowledge of the (raw) prompt itself. This can enable customers to benefit from prompt routing even when handling confidential information. For example, a user can provide a prompt encoding to the router 100, the router 100 can return the model to use, and the user can interact with the model directly, using security provided by the model (e.g., encrypted or hashed communications, closed models, isolated prompt environments, etc.). Additionally, in a similarity variant, using a prompt embedding enables the router to quantitatively compare the prompt to stored representations of prompts previously run on candidate models, enabling the router to filter out dissimilar prompts when determining a selected model based on performance scores associated with stored prompts.

Fifth, in variants where a score prediction model 112 is used, the technology can be more computationally efficient by predicting the response quality label from a single prompt embedding, instead of calculating a custom prompt embedding for each candidate model's response quality prediction. This saves on processing power, since the prompt embedding only needs to be calculated once, and can also save on memory, since only a single set of encoding layers (e.g., layer weights) needs to be stored.

Sixth, routing based on the prompt itself rather than merely information about the prompt (e.g., classifications, etc.) enables the router 100 to capture all information within the prompt (e.g., logic, syntax, etc.). This enables the router 100 to make refined routing decisions for the prompt based on nuances of the prompt itself.

Seventh, the router 100 can improve over time as more prompts are routed and/or as outputs from the selected models 210 are scored. In examples, the runtime model outputs can be scored implicitly using user metrics (e.g., based on whether the user uses the output, whether the user resubmits the same query or a similar query, etc.), explicitly (e.g., based on the sentiment or content of the next user query generated in response to the model output, such as "that was incorrect" or "that was better"), or otherwise scored. In score prediction-based variants, a history of stored prompts and associated scores can be used to refine an existing score prediction model 112 within the router 100 and/or a reward model 30 determining training data for the router 100. In similarity-based variants, a higher number of stored prompt representations 400 increases the likelihood of a runtime prompt being matched with a highly similar prompt representation and/or increases the probability that a high-scoring model can be selected for a subsequent prompt. In some examples, router 100 improvements can be tuned towards prompts coming from a particular user, enabling efficient user-specific routing. In examples where multiple users share the same router 100, routing for low prompt-throughput users can still improve over time as other users route prompts through the shared router 100. The technology can easily accommodate and route prompts to new models without substantially increasing routing latency, cost, or other routing operation metrics due to new model addition, and/or without retraining the entire routing model to accommodate for the new model. In a first example, this can be accomplished by using a score prediction model (SPM) that includes a shared encoder connected to separate scoring heads for each of a set of candidate models. A new model can be added to the system by simply adding a new scoring head in parallel with the other scoring heads, wherein the new scoring head can be trained independently of the other scoring heads (e.g., agnostic to the weights of the other scoring heads) and can be executed in parallel with the other scoring heads during inference (e.g., performance score prediction). In a second example, this can be accomplished using a similarity model. A new model can be added to the system by storing representations of prompts run on the new model alongside performance scores determined for the resulting prompt-response pairs.

Eighth, conventionally, the "best" model to use for a given prompt is extremely difficult to determine, because it is extremely difficult to quantitatively identify the "best" response to the prompt from the responses output by a set of candidate models. Conventional methods leverage model performance metrics like perplexity or a BiLingual Evaluation Understudy (BLEU) score, but these metrics inherently lose information about the model response's relevancy and meaning. Other methods leverage human evaluators, who score the response on an absolute scale for one or more criteria (e.g., relevance, fluency, coherence, etc.). However, human evaluation is oftentimes subjective, prone to bias, and highly variable. Variants of the technology can mitigate these issues by asking human evaluators to rank the responses for a given prompt. The inventors have discovered that response rankings determined by human evaluators are far more consistent, both for a given evaluator over time and across evaluators, than scores on an absolute scale. This enables the human experts to generate an objective, quantitative metric (e.g., the ranking, a performance score determined based on the ranking, etc.) instead of generating a subjective, qualitative metric. In examples, the performance scores are determined based on instruction-following (e.g., how well a model follows the prompt instructions, etc.), which can capture multiple performance metrics (e.g., fluency, coherence, relevance, diversity, contextual understanding, etc.). In variants, the human-generated quantitative metric (e.g., quality ranking, quality rating, etc.) can additionally be augmented (e.g., combined) with other performance metrics (e.g., perplexity, BLEU score, ROUGE metrics, diversity, etc.) to generate a final performance score for a given model's response.

However, further advantages can be provided by the system and method disclosed herein.

3. System

In variants, the system can include a router 100 configured to identify a model for a given prompt, and can optionally include a set of reward models 300. The system functions to identify the best model from a set of model providers for any given prompt. The system can also function to determine a runtime response to a runtime prompt by routing the runtime prompt to a selected model 210 (e.g., a candidate model predicted to perform well on the runtime prompt).

Prompts function as inputs to candidate models 200, and can also function as inputs to the router 100, as inputs to the reward model 300, as inputs to the metadata model 30, as references (e.g., for similarity searches), and/or can be otherwise used. Prompts can be or include text, images, video, audio, sensor data, documents, spatial data, temporal data, tensors, values (e.g., int, float, etc.), signals, 3D measurements (e.g., point clouds, geometric models, etc.), code, vectors, matrices, and/or any other suitable modality of data. Prompts can be automatically-generated or manually generated (e.g., received from a user at a processing system). Prompts can be received from an entity (e.g., a user, third party system via an API, etc.), can be locally generated (e.g., synthetic prompts), can be standard prompts, and/or can be received from any other suitable source. Prompts can be received individually, as a stream of prompts, as a batch, and/or in any other grouping. The system can receive one or more prompts at a time.

Prompts can include structured or unstructured data. In a variant, a prompt can be associated with a particular domain (e.g., text summarization, information extraction, question answering, text classification, conversation, code generation, reasoning, text generation, image generation, video generation, audio generation, document generation, Knowledge-based Language Understanding, math, finance, etc.) or an abstract domain (e.g., a cluster of similar prompts, a domain learned over time based on runtime prompts from multiple iterations of the method, etc.), and/or any other suitable domain. In variants where the prompt is associated with a particular domain, the prompt can include a reference or set of references to associated domains. However, prompts can alternatively not be associated with a domain.

In a variant, prompts can include context from historical prompts, historical model responses, session variables, runtime prompts and responses from prior iterations of the method, and/or another context. In an illustrative example, when a router 100 is iteratively run by a user as part of a "conversation," information relating to prior outputs can be included in the prompt to facilitate conversation continuity. However, prompts can alternatively not include context.

Prompts can include or not include supplemental information or a reference to supplemental information (e.g., stored locally, stored on a user device, stored at a third party database, etc.) on which the candidate model is configured to perform an operation. In a first illustrative example, supplemental information includes a data table included alongside text prompting a candidate model to sort the data table. In a second illustrative example, the prompt can be used to retrieve relevant data from a database of information, wherein the retrieved data and optionally the prompt can be provided to the selected candidate model for response generation (e.g., retrieval-augmented generation (RAG) using the selected candidate model).

Prompts can include or not include user preferences and/or references to user preferences. In a first example, the prompt includes the user preferences. In a second example, the user preferences can be received separately from the runtime prompt, and applicable to a single prompt, all prompts received from the user, and/or any other set of prompts satisfying any other set of conditions. Prompts can include or not include selection parameters.

Prompts can be encrypted (e.g., using a symmetric or asymmetric key shared between the user and the system, etc.) or non-encrypted. Prompts can be encoded or non-encoded (e.g., raw input). In an example, a prompt is encoded (e.g., by the user, by an intermediate encoder 20, using an encoder 20 specific to the router 100, etc.) before the prompt is received by the router 100. In this example, the router 100 can: select the candidate model based on the prompt encoding (e.g., determine model scores based on the prompt encoding, determine metadata based on the prompt encoding, etc.), optionally route the prompt encoding to the selected model 210, and/or otherwise utilize the prompt encoding.

Prompts can be training prompts (e.g., prompts used to train a router 100, encoder 20, and/or reward model 300) and/or runtime prompts (e.g., prompts ingested by the router 100 and/or candidate model during S300). However, prompts can be alternatively configured.

Candidate models 200 function to generate a response for a prompt. The set of candidate models 200 preferably includes multiple models but can alternatively include one model. The set of candidate models 200 preferably includes models provided by multiple providers, but can alternatively include a set of models provided by the same provider. Each candidate model can be specific to a particular candidate model provider or can be run on multiple providers. Each candidate model provider preferably runs a candidate model on a different computing system as the router but can alternatively run a candidate model on the same system as running the router. The system preferably communicates with the candidate model providers via an API (e.g., using locally-stored API credentials for the model provider or a user's API credentials for the model provider), but can otherwise communicate with the candidate model providers. Each candidate model can be executed by the user (e.g., on a user device), be executed by an intermediate provider connecting the user to the processing system executing the router 100, be executed by a provider running other candidate models, executed by a different provider than the providers executing other candidate models, and/or be executed by any other suitable provider. In a variant, the set of candidate models 200 includes other routers 100. Each candidate model preferably includes one model but can alternatively include an ensemble of models.

Each candidate model preferably includes machine learning models, but can additionally or alternatively leverage machine learning models, include non-machine learning methods (e.g., heuristics, rulesets, etc.), and/or have any other suitable architecture. Different candidate models can differ in: provider (e.g., OpenAI vs. Anthropic), architecture (e.g., transformers, diffusion models, generative models, etc.), training data (e.g., data used to train the model), training methodology or parameters, physical infrastructure (e.g., executing on TPUs vs GPUs, executing on accelerators vs. no accelerators, etc.), supported domains or tasks, supported modalities (e.g., text vs. imagery), and/or in other characteristics. Alternatively, different candidate modalities can share characteristics. The candidate models 200 are preferably probabilistic, but can alternatively be deterministic.

In an example, a candidate model can be associated with a set of preprocessing components and/or a set of postprocessing components. In this example, running a prompt through the candidate model can include using the preprocessing components, postprocessing components, and/or no other components.

Examples of candidate models 200 include foundation models, generative models, LLMs, diffusion models, multimodal models, autoencoders, generative adversarial networks (GANs), transformers, deep belief networks (DBNs), CNNs, DNN, and/or any other suitable type of model. Candidate models 200 can be task-specific or generalized. Candidate models 200 can be trained on the same or different data as each other.

The input to a candidate model can include a prompt, supplemental information (e.g., prompt context), user preferences, and/or any other suitable input. Prompt context can include: historic prompts, historic model responses, historic prompts responsive to the historic model responses, auxiliary data retrieved based on the prompt (e.g., documents, data objects, etc.), and/or other information.

Candidate model inputs can be encoded (e.g., encoded separately or together) or not encoded (e.g., cleartext, raw prompt, etc.). The output of the candidate model can include a response, a portion of a response, supplemental information (e.g., transformed supplemental information), and/or any other suitable output. The response can include: text, images, detections, audio, video, code (e.g., control instructions), 3D data, temporal data, and/or any other data in any other suitable modality. The output of the candidate model preferably includes one response but can alternatively include multiple responses.

The candidate model output can also be associated with metrics (e.g., performance scores, metadata), wherein the metrics can be included in the output, be provided alongside the output (e.g., by the candidate model provider), estimated by the system, manually specified (e.g., by the user), and/or otherwise determined.

The candidate model can be associated with metadata. The candidate model's metadata values are preferably estimated before routing a runtime prompt to the candidate model, but can alternatively be determined after (e.g., wherein the metadata values are actual values from running the runtime prompt on the model). In a first variant, each candidate model can be associated with a set of scores representing aggregate metadata or operation characteristics for the model (e.g., average cost, average latency, etc.). In a second variant, each candidate model can be associated with a metadata model 30 configured to calculate metadata (e.g., cost, latency) for a runtime prompt, based on historical costs for similar prompts, and/or other contextual information (e.g., time of day, model load, candidate model architecture, etc.). The metadata model 30 is preferably a regression or other statistical method, but can alternatively be a neural network (e.g., DNN, CNN, GNN, RNN, foundation model, diffusion model, transformers, LLM, etc.), a set of rules or heuristics, and/or have any other suitable architecture. The metadata model 30 can be specific to a candidate model, candidate model provider, model provider-user historical relationship, and/or any other entity. The metadata model 30 can be run by a system running the router 100, the candidate model provider, user, and/or any other suitable entity or computing system. The metadata model 30 can be part of the router 100 or separate from the router 100. However, metadata can otherwise be associated with the router 100 and/or candidate model.

However, the candidate model can be otherwise configured.

Metrics function to provide a measure of candidate model operation. Metrics can include: performance scores (e.g., measurements of qualities of prompt-response pairs), metadata or operation characteristics (e.g., information about an operation instance of a candidate model, such as latency, efficiency, etc.), and/or user metrics (e.g., evaluations of router performance). Metrics can be predictive or evaluative. Metric values are preferably scalar numbers but can alternatively be multidimensional (e.g., vector), natural language (e.g., descriptive), and/or have any other suitable form. Metrics can be binary, discrete, continuous, and/or in any other suitable type. Metrics can be encoded or non-encoded.

Metrics can be determined as part of determining training data S100, using the router S300, or at any other time. Metrics can be generated, received, predicted, aggregated, and/or otherwise determined.

In a first variant, metrics can be generated. Metrics can be generated based on prompts, prompt encodings, responses, user feedback (e.g., ranking of responses), and/or any other suitable information and/or ranking thereof. Metrics are preferably generated by a reward model 300 but can alternatively be generated by another suitable system component. In a specific example of the variant, during S100, a reward model 300 performs pairwise comparisons for pairs of responses within a set of responses for a runtime prompt, and the comparisons are aggregated (e.g., by converting a ranking of responses into a scalar score) to determine a metric for each response based on the comparison. In an embodiment, metrics can be adjusted based on a set of user metrics recorded preferably during and/or after S300, but additionally or alternatively at another suitable time. User metrics can be recorded by the computing system running the router, the router, a user device, and/or another suitable entity or system component. However, the metrics can be otherwise generated.

In a second variant, metrics can be received. In this variant, metrics can be received from a candidate model provider (e.g., for metadata determined by a metadata model 30 corresponding to a candidate model, for performance scores determined by a candidate model-specific score prediction model 112, etc.), a user device (e.g., for latency), and/or any other suitable entity. Metric receipt is preferably performed as a part of S100 or S320 but can alternatively be performed at any other suitable time. In an embodiment, metrics can be user metrics (e.g., result evaluations) referring to the quality of a response determined by the router 100 (e.g., during S300) received from a prompter 10. In this embodiment, user metrics can be used to retrain the reward model 300, the router 100, and/or components thereof (e.g., similarity model 111, score prediction model 112, encoder 20, and/or another suitable component), and/or other suitable models.

In a third variant, metrics can be predicted. In this variant, metrics are predicted based on prompt information, a candidate model (and/or identifier thereof), information about a candidate model, and/or other information. Prompt information can include a prompt, prompt encoding, prompt domain (e.g., prompt class), prompt modality, prompt length, user identity, and/or any other suitable information about a prompt. Metrics can optionally be predicted based on additional information, including runtime contextual information (e.g., time of day, model cost at each time of day, current cost per token, etc.), delay information (e.g., network latency between the router 100, user device, candidate model provider, and/or any other suitable entity), supplemental information (e.g., a data table to be sorted or searched), and/or any other suitable additional information. The metrics can be predicted using a learned metrics model, a model provided by the candidate model's provider (e.g., pricing calculator), and/or by any other suitable entity. In a first example, an inference cost can be calculated based on the number of tokens in the prompt, a predicted output length (e.g., determined from output constraints included in the prompt, user settings for the candidate model, using a response length prediction model, etc.), and a cost per input and/or output token. In a second example, a latency can be predicted for a given candidate model based on the prompt length, the time of day, the current model load, and/or other execution parameters using a latency model (e.g., a regression model, etc.) learned from historic prompt runs. However, the metrics can be otherwise predicted.

In a fourth variant, metrics can be aggregated. In this variant, candidate metrics can each be determined by a different model (e.g., reward model 300 or metadata model 30) and then aggregated (e.g., by averaging, by selecting a maximum/minimum, etc.) to determine a final metric. In this variant, each model can be configured to measure a different metric or variation of the same metric. In a specific example of this variant, different reward models 300 within a set each use different methods to determine a particular metric, and the resulting set of candidate metrics is averaged to determine an aggregated performance metric. Aggregating metrics is preferably performed as a part of S100 or S320. However, metrics can otherwise be determined.

Performance scores can be a type of metric which function to measure qualities of a prompt-response pair. In this method, performance scores are preferably predicted for each prompt-candidate model pair, and are used to select a candidate model for use with the prompt. Performance scores are preferably determined by the router 100 and/or components thereof (e.g., the similarity model 111, score prediction model 112, etc.). Performance scores are preferably predicted for a given prompt and candidate model before the prompt is run through the candidate model and/or any other candidate model within the set of candidate models but can additionally or alternatively be determined or updated after the prompt is run through the candidate model. However, performance scores can otherwise be predicted and/or determined. Performance scores can be specific to a prompt-response pair for a candidate model, a candidate model, a set of prompt-response pairs, a candidate model in a particular context, and/or any other suitable system component. Performance scores can represent subjective and/or objective qualities. Performance scores preferably measure accuracy but can additionally or alternatively measure tone, similarity, precision, recall, precision and recall (e.g., an F1 score), instruction-following, specificity, robustness, fairness, user satisfaction (e.g., estimated based on the runtime prompt and feedback from a user for similar prompts), coverage of a domain associated with the runtime prompt, response comprehension level, harm (e.g., offensiveness, politeness, legality), logical consistency, relevance to prompt, coherence, fluency, safety, bias, specificity, area under the ROC curve, and/or any other suitable quality. Examples of performance scores include perplexity, a BLEU score, a ROUGE score, METEOR, a BERT score, Mean Squared Error, inception score, Fréchet inception distance, perceptual quality metrics, and/or any other suitable performance score. In a variant, prompt-response pair can be associated with a set of performance scores, each performance score of a different type.

Performance scores can be determined by humans (e.g., received from a human as feedback for a runtime prompt), the router 100, a similarity model 111, a score prediction model 112, one or more reward models 300, and/or another suitable entity or component. Performance scores can include target performance scores (e.g., for training the router and/or components thereof) or runtime performance scores (e.g., used by the router to determine a routing). Examples of performance scores can include: accuracy scores, precision scores, F1 scores, a combination thereof, and/or measure any other characteristic of model response performance. However, performance scores can be otherwise characterized.

Metadata (e.g., operation characteristics, operation metrics, etc.) can be a type of metric which function to measure qualities of the response determination process for a prompt-response pair (e.g., qualities of the candidate model determining the response). In this method, metadata is preferably calculated at runtime by the candidate model provider or router 100 before a prompt is run on a candidate model. However, metadata can alternatively be calculated and/or updated before or after the prompt is run (e.g., a candidate model provider can provide a resource cost quote before running the candidate model and/or can provide an actual resource cost after running the candidate model). In an example, metadata can be automatically measured by the entity running the router 100. In a specific example, the entity running the router 100 can measure the time elapsed between the user and/or entity sending a runtime prompt to a candidate model provider and the user and/or entity receiving the respective runtime response from the candidate model provider. Metadata preferably describes Quality of Service (QOS) metrics but can additionally or alternatively describe other metrics. Metadata or operation characteristics can include monetary cost (e.g., in fiat) but can additionally or alternatively describe latency, candidate provider location, resource allocation (e.g., memory allocation, number of processor cores or threads, amount of processing time, etc.), candidate model traffic or load, response length (e.g., characters, words, tokens), variance/distribution of a performance metric, security (e.g., number of different servers used for the candidate model), inference carbon cost, and/or any other suitable information about running the candidate model. However, metadata can be otherwise characterized.

User metrics can be a type of metric which function to assess the quality of a router at runtime. User metrics can be performance scores and/or can be data from which performance scores are generated. In a first embodiment, user metrics can include user-generated evaluations of responses determined in S300. In this embodiment, user metrics can include any suitable type of performance score. In a first example, a user metric is a binary indicator of whether a provider (e.g., a user of an implemented product offered by the provider) liked a response. In a second example, a user metric is a performance score manually or automatically determined at a provider. In a second embodiment, user metrics can include information from which a performance score can be determined. In examples, user metrics can be the number and/or quality of clarifying prompts submitted to the router 100 afterwards, whether a prompter 10 switched router providers, whether a prompter 10 adjusted router settings, whether a prompter 10 repeated the prompt, whether the result returned to the prompter was a non-error response, and/or any other suitable type of data related to the prompter 10 and/or selected model S210. In this embodiment, user metrics can be determined at the router, at a provider server, at a user device, and/or at any other suitable location. However, user metrics can be otherwise characterized.

However, metrics can be otherwise characterized.

The router 100 functions to select a model within a set of candidate models 200 based on a prompt. Specifically, the router 100 can dynamically select an optimal model (e.g., selected model) for each prompt based on the nature of the prompt. Instead of committing to a single model and pushing for incremental gains in performance on that model alone (e.g., like with fine tuning, prompt engineering, retrieval-augmented generation (RAG)), the router 100 looks at an entire ecosystem of LLMs and determines the best tool for each prompt. The router 100 preferably considers all candidate models within the set of candidate models 200 but alternatively considers a subset of candidate models 200. The router 100 is preferably generalized (trained on training prompts for multiple domains and/or modalities) but can alternatively be specific to a domain (e.g., trained only on training prompts from the domain), modality, application, user and/or another suitable context. The system preferably includes a single router configured to ingest all prompts, but can alternatively include multiple routers (e.g., multiple runtime routers; multiple candidate routers and a single or subset of runtime routers; etc.). In variants with multiple routers, routers can be general or specific to a prompt domain, prompt modality, prompter (e.g., user), physical location, architecture, and/or otherwise differ. In variants with multiple routers, the method can optionally include classifying the request context based on the request (e.g., the prompt), then selecting the router associated with the request class for subsequent use. In a specific example, the system can include multiple routers, each of which is configured to determine a different performance score (e.g., different type of performance score, different way of computing the same type of performance score, performance score for different domains, etc.). In this specific example, the output performance scores are aggregated (e.g., using a weighted calculation, optimization, voting, randomly-selected and/or another suitable aggregation method) to determine a final performance score which is used to determine the set of performance scores for the prompt. In this specific example, the aggregation mechanism can be based on or agnostic of user preferences received from the user in S310, Additionally or alternatively, the user preferences can optionally affect the output performance scores (e.g., the generation of output performance scores by the multiple routers). Additionally or alternatively, the router can be used as a generalized router (e.g., for any prompt), without classification, without prompt pre-inference on any candidate models, and/or otherwise used.

Figure 11A:
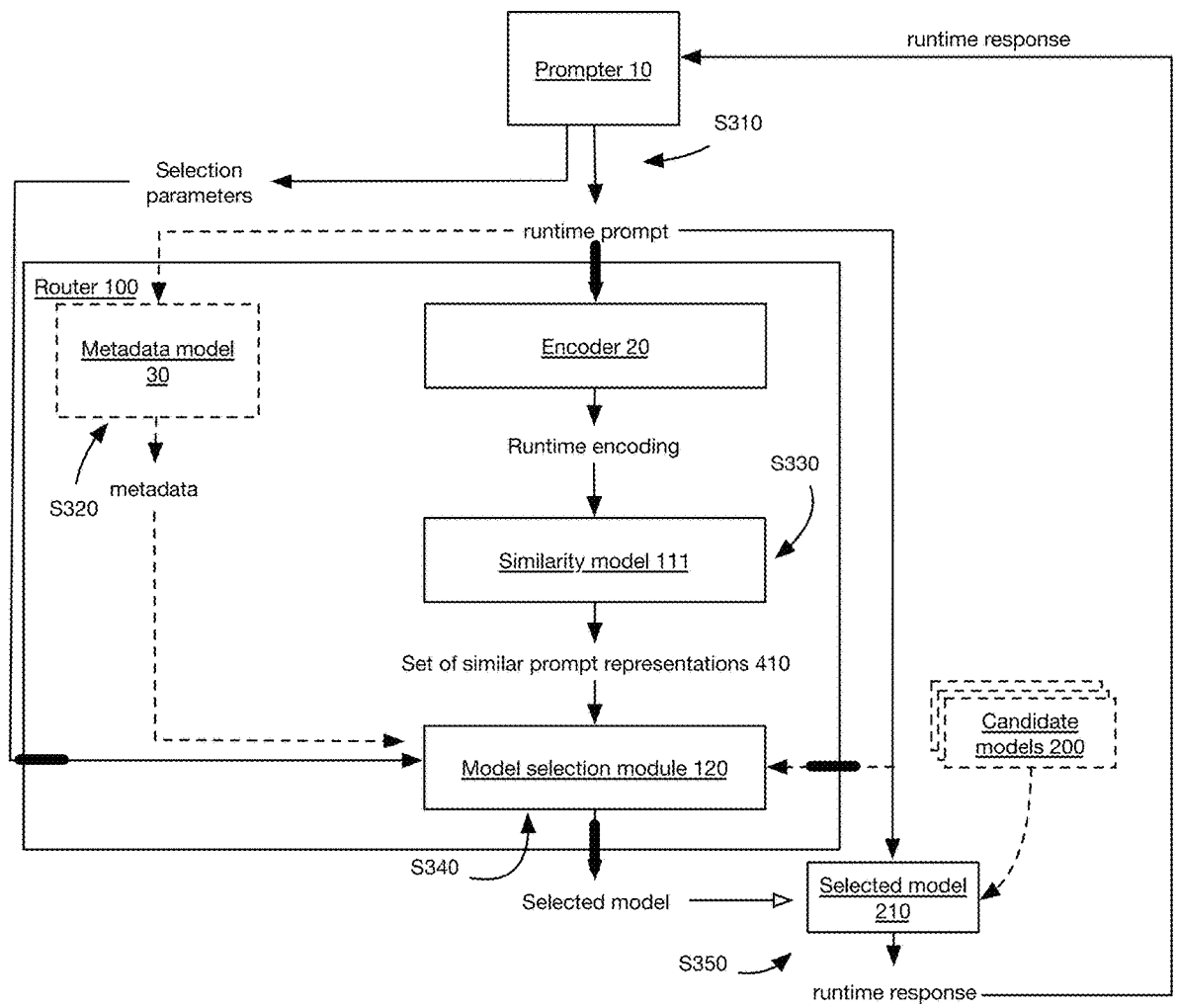
FIGS. 11A and 11B are examples of variants of S300 performed using the first and second variants of the router, respectively

The router 100 can route based on stored or generated performance scores. In a first variant, the router 100 includes a similarity model 111 configured to determine a similarity of the prompt to another prompt for which performance scores are stored, determine a subset of most similar stored prompt representations 410, then use the stored performance scores to route the prompt (e.g., example shown in FIG. 11A). For example, the router 100 can route the prompt to a model with a high performance score for a similar historic prompt.

In the first variant, the similarity model 111 functions to determine a performance score for a prompt and a candidate model by comparing the prompt (e.g., or encoding thereof) to a set of stored representations of historic prompts (e.g., parameters of historic prompts). Each stored prompt representation and/or set of prompt parameters can be associated with one or more sets of performance scores, each set of performance scores corresponding to a candidate model and historic response for which the respective set of performance scores was determined. In a first example, a candidate model's response is scored on multiple different dimensions or metrics, such as accuracy, precision, F1, tone, concision, and/or other dimensions or metrics (e.g., which can be given the same or different weight when used to select the runtime model). In a second example, multiple responses can be determined by a single candidate model for a given prompt, wherein each response is individually scored. In an embodiment where each stored prompt representation is associated with multiple performance scores, the performance scores associated with the stored prompt representation can be used in a multivariate optimization during S340 to select a candidate model. Stored prompt parameters can include prompts, prompt classes, prompt representations (e.g., encodings, embeddings), prompt features, prompt domains, and/or any other suitable parameter of a prompt.

Figure 13:
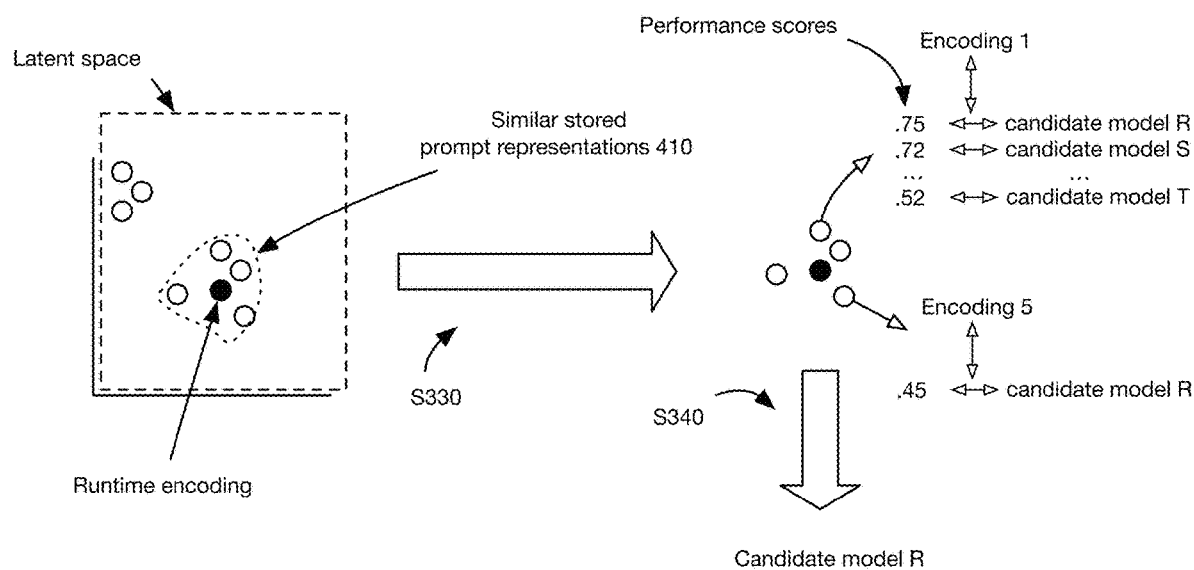
FIG. 13 is an illustrative example of a variant of determining the candidate model based on similar encodings.

In an example, the similarity model 111 operates on prompt encodings (e.g., stored prompt representations 400) within a latent space, wherein each prompt encoding can be associated with a candidate model response, metrics for the candidate model response, and a candidate model identifier (e.g., example shown in FIG. 13). Prompt encodings can be clustered or non-clustered within a latent space. Each latent space can correspond to a particular attribute of a prompt (e.g., dialect category, topic, comprehension level, etc.) but can alternatively represent an abstract latent space. The latent space can be: a general latent space, semantic latent space, multimodal latent spaces, cyclical latent spaces, autoencoder-generated latent space, and/or any other suitable latent space. In variants where the stored prompt representations 400 include encodings, the similarity model 111 can include a set of encoders 20 and/or can communicate with a set of encoders 20. Examples of encoders or embedding techniques that can be used include: the encoding layers of a neural network (e.g., initial layers from a CNN, DNN, or other neural network trained end-to-end to classify a prompt, determine a performance score for a prompt, etc.; the encoding layers from the second router variant described below, etc.); an autoencoder (e.g., variational autoencoder, autoencoder without variational inference, etc.); a hashing method; target encoder, embedding model (e.g., word2vec, etc.), contextual embedding model, sentence embedding model, semantic embedding model, and/or other suitable encoder.

The encoder 20 can be run on the same computing system as the router (e.g., as part of the router) and/or can run remotely from the router (e.g., at a user device, at a provider, and/or at an intermediate entity). In an example, the encoder 20 can be trained and/or run at a user device (e.g., remote from the device hosting the router 100). In this example, the similarity model 111 can be run at the user device or remotely from the user device and can determine similarity based on information (e.g., prompt encodings) received from the user device. However, the encoder 20 can alternatively be part of the router 100 (e.g., where the device hosting the router 100 receives a runtime prompt and determines an encoding based on the runtime prompt).

The encoder 20 can be trained and/or run before the routing is determined (e.g., using the prompt or prompt encoding to determine a routing), after the prompt is routed, and/or at any other suitable time.

The system can include a single encoder 20 or multiple encoders 20 (e.g., to encode different types of information for a prompt). An encoder 20 can ingest a prompt, prompt class, candidate model parameters, candidate model hyperparameters, and/or any other suitable information about a prompt-candidate model pair. However, the encoders 20 can be otherwise configured.

The similarity model 111 can additionally or alternatively function to cluster similar stored prompt representations 410 representing historic prompts based on their similarity (e.g., distance of encodings from each other). The similarity model 111 can identify the most similar set of stored prompt representations, a most similar set of clusters of stored prompt representations, and/or any other grouping of stored prompt representations 400.

The similarity model 111 can include architectures which facilitate determining prompt similarity in a variety of ways. In a first embodiment, the similarity model can use clustering methods (e.g., k-means clustering, hierarchical clustering, etc.) to determine a cluster of stored prompt representations and/or to determine which cluster a runtime prompt belongs to or not include clustering methods. In a second embodiment, the similarity model can use distance-based methods (e.g., wherein similarity is determined by calculating a distance between a prompt encoding and a stored prompt representation). In a third embodiment, the similarity model can include kernel-based methods (e.g., wherein the similarity model 111 uses a support vector machine to map prompts into a high-dimensional space and cluster the prompts and/or determine a distance between prompts in the high-dimensional space). In a fourth embodiment, the similarity model can include a graphical neural network (GNN) (e.g., to determine a similarity of prompts represented as graphs, etc.). In a fifth embodiment, the similarity model can use ensemble methods (e.g., random forest, etc.) to determine prompt similarity. However, any suitable combination of embodiments of aforementioned architectures and/or other suitable architectures can be used. In an example, the similarity model 111 uses a k-nearest neighbors method to identify stored representations of historic prompts similar to an runtime prompt (e.g., based on similarity in a latent space determined in any of the aforementioned embodiments), wherein the response scores for candidate models associated with the identified historic prompts are used to select the candidate model. In examples, the candidate models and associated performance scores can be aggregated from the prompt representations within the cluster, and used to select the runtime model. However, the similarity model 111 can be otherwise configured.

Figure 8:
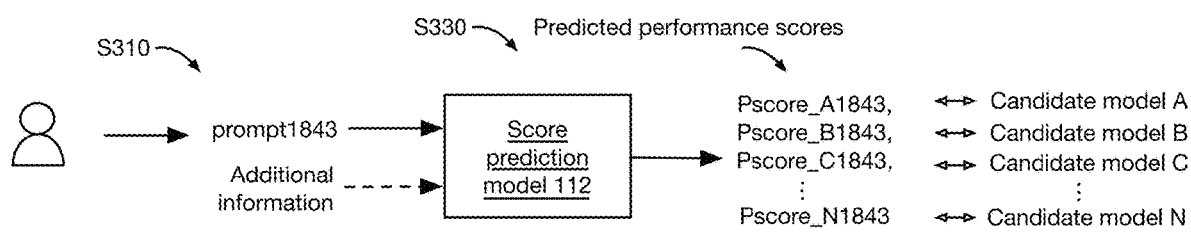
FIG. 8 is an example of a variant of determining performance scores.

In the second variant, the system can include a score prediction model 112 (e.g., an SPM; a predictive reward model) trained to predict performance scores for candidate models 200 for a runtime prompt (e.g., example shown in FIG. 8). In a first example, the router 100 is a classifier with multiple heads, each corresponding to a different candidate model, wherein the router 100 predicts a score for each candidate model using the corresponding output head. In a second example, the router 100 can determine a score for each of a set of candidate models 200, wherein the candidate models' scores are associated with historic prompts similar to the prompt of interest (e.g., within an embedding space).

An SPM can be a single SPM that predicts a performance score for each of a set of candidate models 200; alternatively an SPM can be a model-specific SPM, a domain-specific SPM, and/or be otherwise generalized or specific. In an example of a model-specific SPM, the SPM is a linear regression which calculates a performance score for a model using prompt features (e.g., prompt type, prompter identity, prompt domain, prompt modality, etc.) as independent variables. In another example of a model-specific SPM, the SPM can be trained on target performance score-training prompt pairs, wherein the target performance scores (e.g., "target scores") are determined based on results output by the respective model. In an example of a model-agnostic SPM, the SPM is a multiheaded classifier which determines a performance score for each of a set of candidate models 200. SPMs can be run locally (e.g., as part of the router 100) or by a third party (e.g., by the device hosting the candidate model, a third party evaluator, etc.), wherein the router 100 receives a performance score for a candidate model from the candidate model provider before the prompt is routed. The SPM preferably includes a classifier (e.g., a multi-headed classifier), but can alternatively or additionally use logistic regression, random forest, support vector machine (SVM), ensemble methods, evolutionary algorithms, and/or any other suitable methods. The SPM preferably includes a first set of encoding layers configured to determine an encoding for a prompt and a second set of parallel sets of decoder layers (e.g., one set of decoder layers for each candidate model) configured to determine a score. However, the SPM can include any architecture, including DNNs, CNNs, transformer-based models, encoder-decoder models, multiclass classifiers, multiheaded scoring models, and/or any other ML-based or non-ML based model type. The SPM can combine of elements of ML-based and non-ML-based methods.

Figure 7:
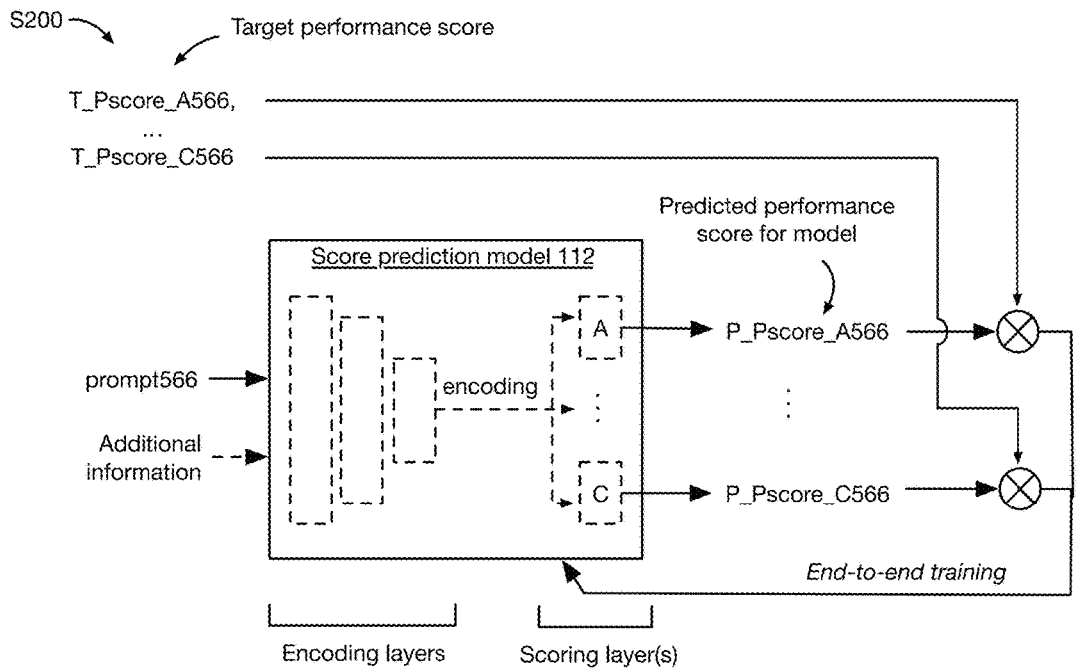
FIG. 7 is an example of a variant of a score prediction model.

The SPM can include a shared set of prompt encoding layers that are connected to multiple sets of scoring layers (e.g., scoring heads), wherein each scoring layer set corresponds to a different candidate model (e.g., example shown in FIG. 7). The SPM can receive a prompt and optionally additional information (e.g., prompter identifier, context, etc.) as input, and generate an output that can be used to select one or more candidate models 200 for prompt routing (e.g., a performance score, a candidate model identifier, etc.). In this variant, the prompt encoding layers are configured to encode the prompt (and optionally the additional information) into a prompt encoding, and the scoring layer sets are configured to predict a performance score for the respective candidate model based on the prompt encoding.

The encoding layers can include: an encoder 20, a set of layers (e.g., initial set of layers, intermediate set of layers, the encoding layers from an autoencoder, etc.) from a model trained end-to-end to predict a performance score given a prompt, and/or any other suitable set of encoding layers. The encoding layers are preferably shared across the scoring heads (e.g., feed into all the scoring heads), but can additionally or alternatively be shared across a subset of the scoring heads, be specific to a single scoring head, and/or be otherwise shared. The encoding layers are preferably trained using all available training prompt-performance score pairs, but can alternatively be trained using a subset of the training prompt-performance score pairs (e.g., for a subset of the candidate models 200, sampled from the training prompt-performance score pairs for each candidate model, for a class of candidate models 200, etc.).

The scoring heads are preferably each specific to a single candidate model, but can alternatively be specific to a subset of candidate models 200 (e.g., wherein the SPM can include sub-heads specific to candidate models 200 within the subset), or be otherwise related to the candidate models 200. Different scoring heads of the SPM can have the same or different architecture. Examples of scoring head architectures that can be used can include: a classification head, a regression head, a segmentation head, attention mechanism head, can leverage non-machine-learning methods (e.g., rules, rankings, ratings, lookups, etc.), or be otherwise constructed. Each scoring head preferably outputs a predicted performance score for the respective candidate model (e.g., indicative of the quality of the response that the candidate model is expected to produce responsive to the prompt), but scoring heads can additionally or alternatively output a probability of candidate model selection, a candidate model ranking or rating, and/or any other output. Each scoring head is preferably trained independently, based on the training prompt-performance score pairs for the respective candidate model, but can alternatively be trained with other scoring heads.

Alternatively, the SPM can include a set of submodels (e.g., executing in parallel, an ensemble of models, etc.), wherein each submodel is specific to a different candidate model; a different set of equations for each candidate model; a classifier that outputs a ranked list of candidate models 200; and/or be otherwise constructed.

In an embodiment, the score prediction model 112 generates a predicted performance score by running a generated program corresponding to the model (e.g., wherein the program replicates the functionality of the model) and determining a performance score by evaluating the output of the generated program. In this embodiment, the generated program can be the "generated program" described in U.S. application Ser. No. 18/800,731 filed 12 Aug. 2024 and titled A METHOD FOR CONVERTING MODELS TO PROGRAMS, incorporated herein in its entirety by this reference, which claims the benefit of U.S. Provisional Application No. 63/532,206, filed 11 Aug. 2023, U.S. Provisional Application No. 63/588,611, filed 6 Oct. 2023, and U.S. Provisional Application No. 63/598,779 filed 14 Nov. 2023, each incorporated herein in its entirety by this reference, or be otherwise generated. In this embodiment, the predicted performance score can be generated by a reward model 300; however, the predicted performance score can be generated by any other suitable model.

However, the score prediction model 112 can be otherwise configured.

Figure 11B:
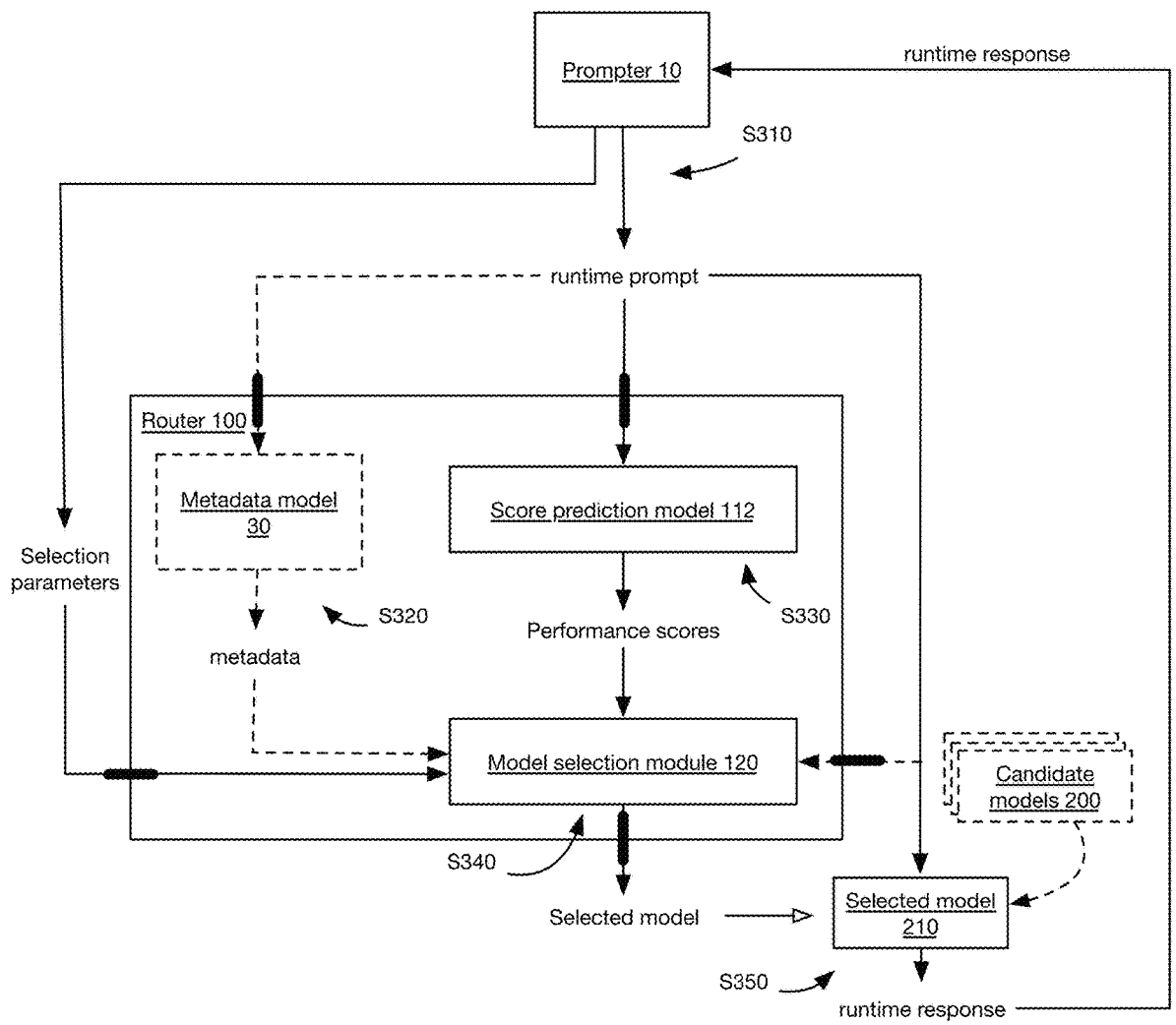

The router 100 can include an optional model selection module 120 which functions to select a candidate model based on metadata, determined performance scores, selection parameters, and/or other information. The model selection module 120 can be a model, an optimization function, a set of heuristics, a ruleset, and/or any other suitable module. The model selection module 120 can be run on the same or different computing system as that running the router 100. The model selection module 120 can optionally use a set of selection parameters (e.g., example shown in FIG. 11B). The selection parameters can be received as user preferences (e.g., alongside the runtime prompt), learned based on user feedback (e.g., user metrics), received alongside the prompt, and/or can be otherwise determined. The selection parameters can include a set of weights representing varying priorities of conflicting goals, a ranked list of performance score types, preferred qualities of a chosen candidate model (e.g., proof of correctness, whether the candidate model can be optimized, etc.), candidate model preferences (e.g., a model whitelist, model blacklist), a set of constraints (e.g., minimum and/or maximum threshold values for different metadata or operation metrics, etc.; maximum monetary cost, etc.), operation metric preferences (e.g., per-run cost preferences, latency preferences, etc.), and/or any other suitable type of user preference. Selection parameters can relate to performance (e.g., accuracy, precision, F1 score, etc.), metadata (e.g., monetary cost, computing resource cost, model latency, net runtime latency, etc.), and/or any other suitable metric. Selection parameters can be in any suitable data format (e.g., text, numbers, equations, encodings, etc.). In a first example, selection parameters are a set of weights each corresponding to a different optimization target (e.g., metric) in a multivariate optimization. In a second example, selection parameters are constraints on metrics (e.g., maximum allowable cost, latency, etc.). However, the selection parameters can be otherwise defined.

The model selection module 120 can optionally additionally determine model settings for the selected model 210. Model settings function to change how a selected model performs during inference. Model settings can include context parameters, conditional inputs, auxiliary features, control variables, response token counts, and/or other suitable supplementary inputs. In an example, model settings include a response token count. However, model settings can otherwise be configured.

The model selection module 120 can optionally additionally select a candidate model provider in combination with or separately from selecting a candidate model. The model selection module 120 can optionally select a computing system on which to run the candidate model in combination with or separately from selecting a candidate model. However, the model selection module 120 can select any other suitable parameters for inference.

However, the model selection module 120 can be otherwise configured.

The router can be trained and/or refined using training data (e.g., in S100). In the similarity variant of the router 100, training data can be used to train the encoder 20, be used as stored performance score values associated with the stored prompt representations 400, and/or otherwise used. In the score prediction variant of the router 100, training data can be used to train the score prediction model 112. Training data preferably includes training prompts and/or representations thereof (e.g., an encoded prompt), training responses or representations thereof (e.g., an encoded response) generated by a candidate model, and/or a performance score for the response (e.g., target performance score); however, training data can optionally include no response. Training data preferably spans multiple domains and/or multiple modes, but can alternatively be otherwise distributed. Optionally, training data can be generated and/or adjusted based on user metrics. However, training data can otherwise be defined.

However, the router 100 can be otherwise configured.

The system can include an optional reward model which functions to determine target performance scores used to train the router (e.g., in S100) in variants of S100 where target performance scores are automatically determined. The system can use or include one or more reward models 300. Different reward models 300 can differ in: model architecture, training data, domain specialization (e.g., a first reward model 300 can be used to score outputs for code generation prompts, while another is used to score outputs for image interpretation prompts), modality (e.g., input modality), model architecture specialization (e.g., a first reward model 300 can be used to score outputs from CNNs, while another is used to score outputs from DNNs), domain (e.g., one reward model can evaluate mathematic accuracy and another reward model can evaluate instruction-following, etc.) and/or otherwise differ.

Figure 5B:
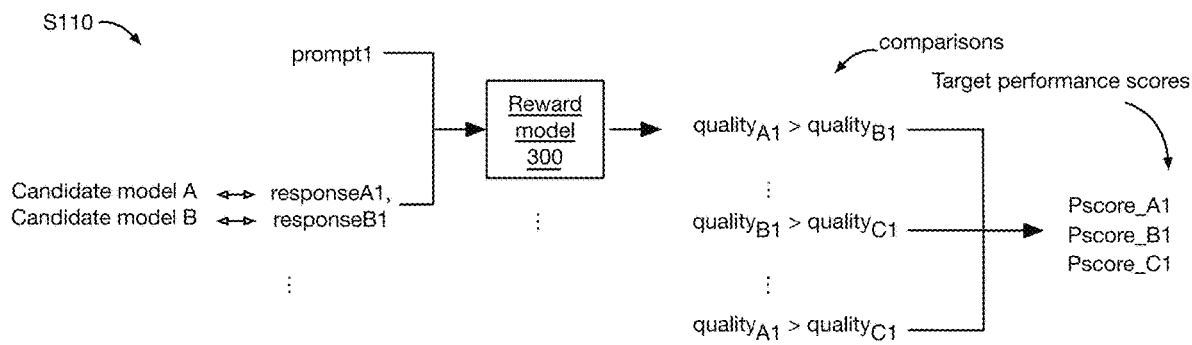
Figure 6A:
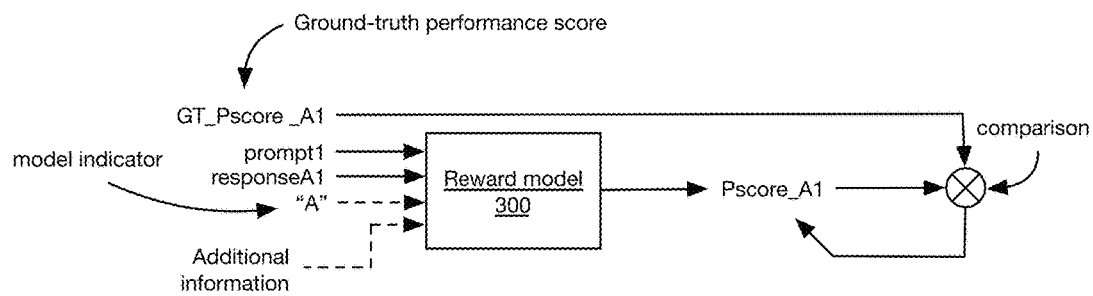
FIGS. 6A-6B are schematic representations of variants of training a reward model.
Figure 6B:
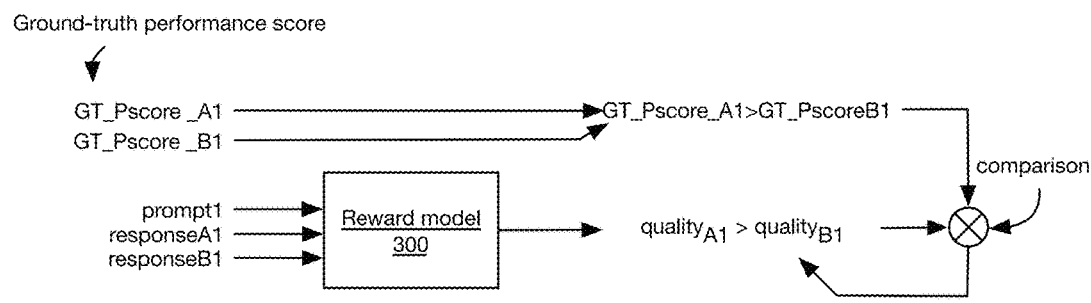

In a first variant, the reward model 300 is configured to compare a first training response and a second training response, and determine which response is higher-performing (e.g., with respect to a particular metric or a generalized "performance score"; an example of training such a reward model 300 is shown in FIG. 6B). The outputs of different reward models 300 (e.g., comparison of a training response to multiple other training responses) can be then aggregated to determine a target performance score for each training response (e.g., example shown in FIG. 5B).

Figure 5A:
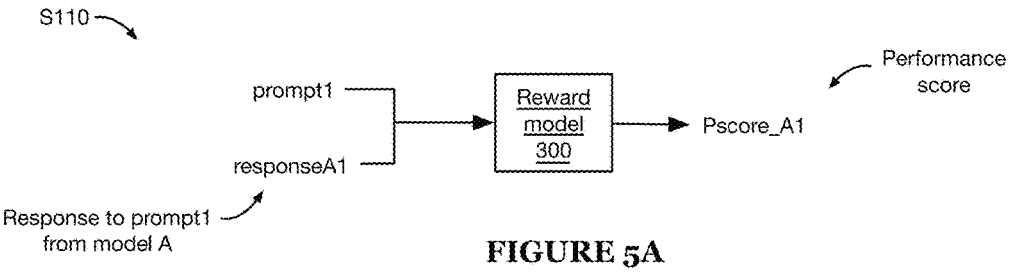
FIGS. 5A-5C are schematic representations of variants of S110.

In a second variant, the reward model 300 is configured to directly calculate the target performance score for the prompt-response pair (e.g., example shown in FIG. 5A). In this variant, examples of the reward model 300 can include a ROUGE model (e.g., calculating the syntactic overlap between candidate and reference summaries), BLEU model (e.g., comparing the response to one or more reference translations for the prompt), BERTScore model (e.g., using BERT to calculate the quality of the response), a program analysis model (e.g., static program analyses; dynamic program analysis; etc.), and/or any other suitable model.

In a third variant, the reward model 300 is a model that is trained to predict a performance score for the training prompt-response pair (e.g., example shown in FIG. 6A). In examples, this can enable the system to rapidly generate large volumes of labeled training prompt-response pairs across one or more domains, without human intervention. In examples, the reward model 300 can be trained on the training data. In these examples, the reward model 300 can be trained to predict the target performance score, given the prompt, response, and optionally the candidate model identifier as inputs. However, the reward model 300 can be otherwise trained. The reward model 300 can be a neural network (e.g., DNN, CNN, transformer, etc.), LLM, set of equations, set of rules, and/or any other suitable model. In variants where the reward model 300 is an LLM, the LLM can be prompted to determine different types of performance scores (e.g., politeness, instruction-following) based on the prompt-response pair.

Figure 5C:
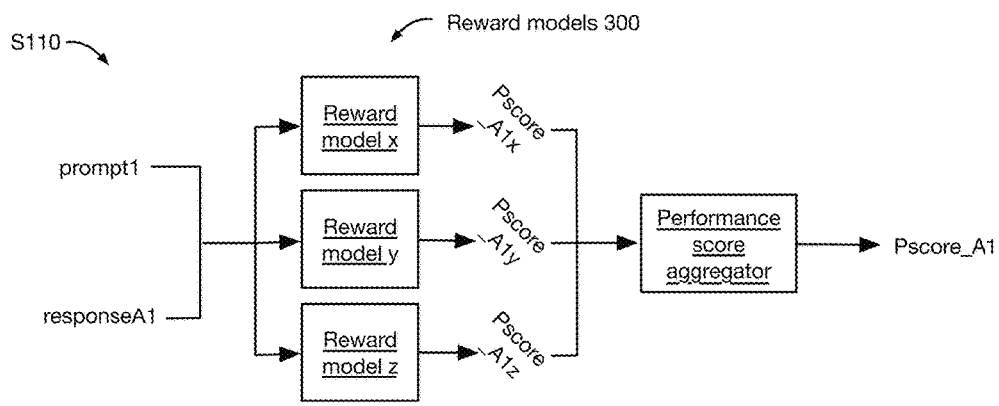

A reward model 300 can be specific to a domain (e.g., example shown in FIG. 5C; wherein the training prompt-response-performance score sets used to train the reward model 300 are specific to the domain) or generic across domains (e.g., wherein the training prompt-response-performance score sets are distributed across multiple domains). Examples of domains include accuracy, tone, and instruction-following, but other domains can be used. A reward model 300 can be trained to determine a particular type of performance score (e.g., accuracy, an F1 score, etc.) or a generalized performance score (e.g., an aggregate performance score). A reward model 300 can be used for all candidate models 200 in a set of candidate models 200, a subset of candidate models 200, or one candidate model. However, the reward model 300 can otherwise determine a performance score.

The reward models 300 can be trained on human-generated data, data determined by another reward model 300, data received from a third party, and/or data of any other suitable type. The reward models 300 preferably receive the training prompt and the paired response as input and predicts the performance score based on the training prompt-response pair, but can be otherwise trained and/or configured. The reward model 300 can additionally or alternatively output weights for how much each subset phrase in the prompt informed the target performance score. The reward model 300 can optionally additionally accept additional information as inputs, such as prompter identity, prompt context (e.g., data representing prior prompts and/or chosen candidate model responses), model status, model size, model settings (e.g., used to obtain the result, such as temperature, top K sampling, top P sampling, maximum length, etc.), language classification, and any other suitable information.

In variants, the reward model 300 can output a single target performance score or set of target performance scores. In a variant where the reward model 300 outputs a set of target performance scores, each target performance score in the set of target can be a performance score in a different domain (e.g., accuracy, conciseness, politeness, etc.). Additionally or alternatively, the system can optionally include multiple reward models 300 each trained to output a target performance score in a different domain. In variants where the reward model 300 or set of reward models are configured to output multiple target performance scores, the target performance scores can optionally be aggregated (e.g., averaged, etc.) optionally using a set of weights (e.g., user preferences) to generate a primary target performance score. However, the reward model can otherwise output multiple target performance scores.

The reward model 300 is preferably generated once (e.g., before S100), but can additionally or alternatively be generated (e.g., retrained) each time a new set of prompt-response-performance score sets are received, each time a new candidate model is added to the system, responsive to receipt of a set of user metrics, and/or at any other suitable time.

The reward model 300 is preferably generic and shared across all prompters 10 (e.g., users), but can alternatively be specific to a prompter 10. In the latter variant, the reward model 300 can be finetuned using prompter-specific prompt-response-performance score groupings (e.g., wherein the prompter 10 provides a performance score for the prompt-response pair) or can be otherwise tailored for the prompter 10. In a specific example, a reward model 300 starts as a generic reward model 300, but as more information is learned about a customer (e.g., from customer evaluations or scorings of candidate model outputs from runtime prompts), the reward model 300 is fine-tuned to align with the customer information. For example, the reward model 300 can be trained (e.g., by updating the reward model weights) to predict the score given the runtime prompt and runtime response.

However, the reward model 300 otherwise be configured.

The models (e.g., score prediction model 112, encoder 20, similarity model 111, selection model, candidate models 200, reward model 300 etc.) can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naïve Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. However, the models can otherwise determine the output based on the input data.

The router 100, reward models 300, and/or other system models are preferably hosted by the same entity (e.g., a "router provider"), but can alternatively be hosted by different entities. The candidate models are preferably hosted by a different entity (e.g., third party model providers), but can additionally or alternatively be hosted by the system. In variants where the models are hosted by different entities, the entities can be in communication with one another via APIs and/or another suitable means of communication.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the system can be otherwise configured.

4. Method

In variants, as shown in FIG. 1, the method can include optionally determining training data S100, optionally determining a router S200, and/or using the router S300. The method functions to generate a routing system which can identify a candidate model (or set thereof) that are predicted to return high-quality responses for a given prompt. All or portions of the method can be performed in real time (e.g., responsive to a prompt), iteratively, concurrently, asynchronously, periodically, and/or at any other suitable time. All or portions of the method can be performed automatically, manually, semi-automatically, and/or can be otherwise performed. All or portions of the method can be performed using the system described above, or be performed using any other suitable system.

Optionally determining training data S100 functions to determine a set of ground-truth data for training the router 100 and/or elements of the router 100. S100 is preferably performed by a reward model or set of reward models, but S100 can alternatively or additionally be performed by a program ingesting human input, a communication module, a candidate model, and/or another suitable system component or non-system component (e.g., a remote entity). S100 can preferably be performed at the computing system hosting the router (e.g., locally) but can alternatively be performed at a computing system of a user, candidate model provider, and/or another suitable entity. S100 can be performed before and/or during initial training of the router 100 (e.g., and/or elements thereof) and/or can additionally be performed before and/or during retraining of the router S100. S100 can include generating a new set of training data and/or amending an existing set of training data (e.g., based on user metrics).

Figure 2:
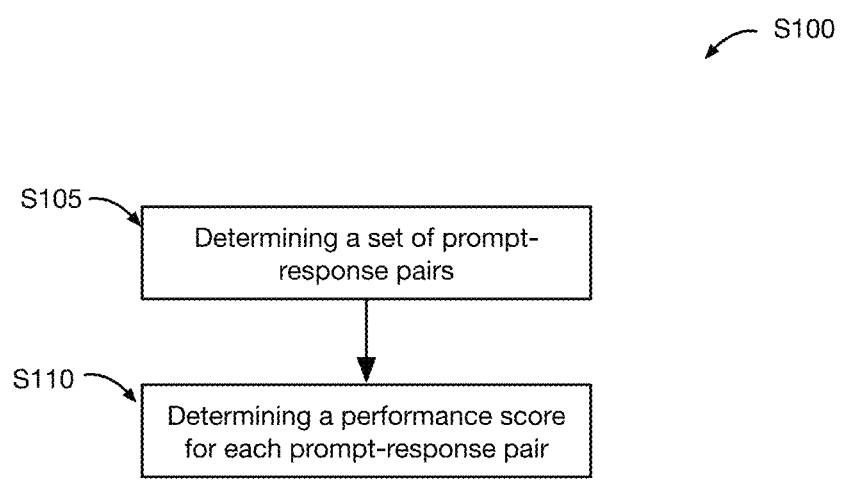
FIG. 2 is a schematic representation of a variant of S100.

Determining training data S100 can include determining a set of prompt-response pairs S105 and/or determining a performance score for each prompt-response pair S110 (e.g., example shown in FIG. 2).

Figure 4:
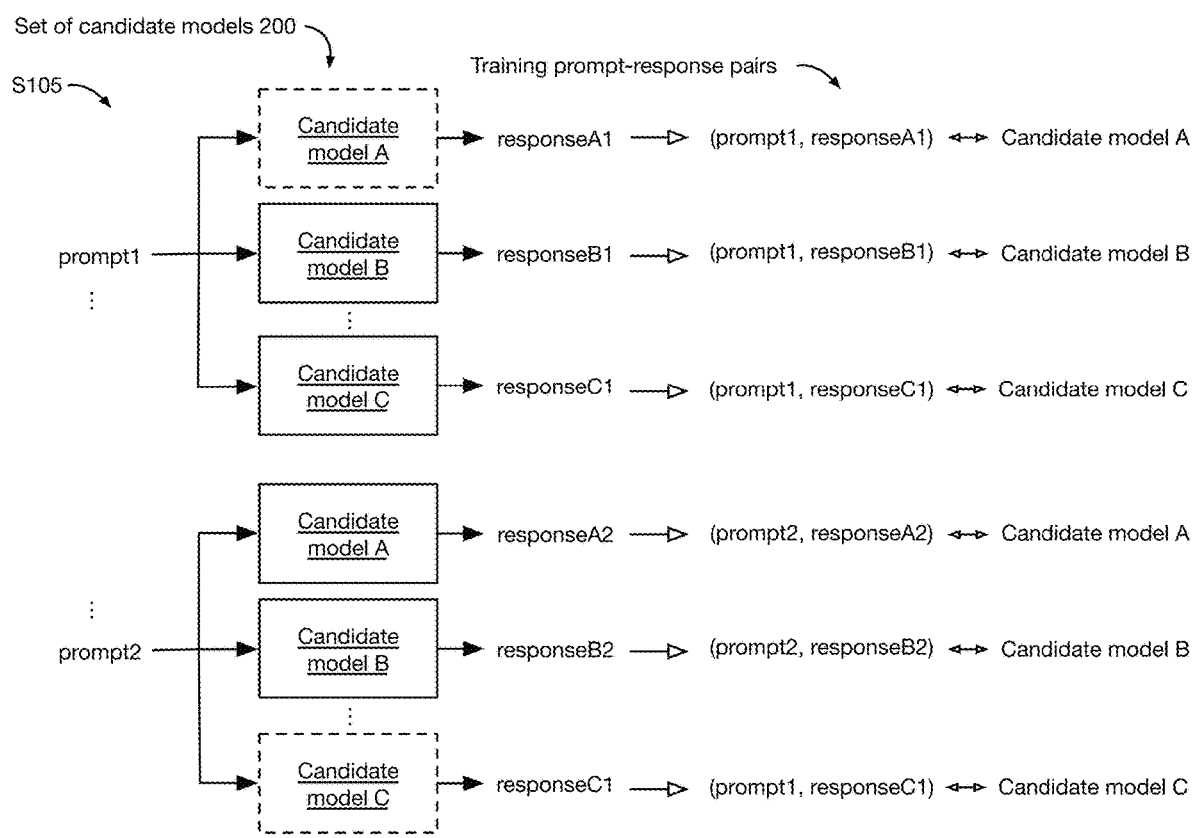
FIG. 4 is a schematic representation of a variant of S105.

Determining a set of prompt-response pairs S105 functions to determine raw data for evaluating how well each candidate model responds to a prompt (e.g., example shown in FIG. 4). Determining a set of prompt-response pairs can include: determining a set of training prompts; determining one or more training responses from each candidate model for each training prompt; and pairing each resultant training response with the corresponding candidate model and the training prompt. The set of training prompts can be manually determined, automatically determined, be learned, be determined from a standard set of prompts, be sampled from a distribution of prompts, and/or be otherwise determined.

The set of training prompts can have a prompt domain distribution that approximates the prompt domain distribution of the test prompt set (e.g., the prompts that will be received by the SPM for routing), but can alternatively have any other distribution. In an example, the set of training prompts can include runtime prompts input during a prior iteration of the method. The one or more training responses from each candidate model can be determined by running each training prompt through the candidate model (e.g., individually run through the candidate model) one or more times or otherwise determined. The set of candidate models 200 can be the same set of candidate models 200 as those used in S300 but can alternatively be a set of different candidate models 200, be a subset of the set of candidate models 200, and/or be any other suitable set of candidate models 200. In variants, all or a subset of candidate models 200 in the set of candidate models 200 can be used to generate training responses for a given training prompt. The training responses can be stored in association with the corresponding training prompt to generate a prompt-response pair. Other candidate model information (e.g., an identifier, the cost, the latency, etc.) can additionally be determined (e.g., recorded, received, etc.) and stored with each prompt-response pair.

However, determining a set of prompt-response pairs 105 can be otherwise performed.

Determining a performance score for each prompt-response pair S110 functions to determine a target performance score (e.g., a ground-truth performance score) for each prompt-response pair. Prompt-response pairs can be scored by a human evaluator, by a reward model 300, by executing the response (e.g., wherein the response includes code) and evaluating the output, and/or by any other entity or method.

In a first variant of S110, the target performance score can be determined by a human evaluator. The human evaluator can be an expert in the prompt domain, be an unspecialized evaluator, and/or have any other skill set. In a first embodiment, the human evaluator ranks the responses to a given prompt (e.g., the responses paired with the same prompt), wherein the responses are from different candidate models 200 (e.g., example shown in FIG. 3). This can be repeated by one or more human evaluators for a set of prompts and responses, wherein the individual rankings can be averaged, summed, combined, or otherwise aggregated to form global rankings. In a first example, the ranking itself can be used as the target performance score. In a second example, the target performance score can be derived from the ranking. In a first specific example, the target performance score can be a ranking determined using median rank, average rank, Borda Count method, a reciprocal rank method, and/or any other suitable ranking method. Rank value inputs to these methods can optionally be weighted (e.g., using weighting methods, Kendall's Tau methods, etc.). In a second specific example, the target performance score is a rating calculated from a set of rank values (e.g., using Elo method, Bradley-Terry models, Plackett-Luce models, etc.). In a second embodiment, the human evaluator assigns a target performance score (e.g., score on an absolute scale) to the response for one or more criteria (e.g., relevance, fluency, coherence, etc.). In a third embodiment, a human (e.g., domain expert) can use pairwise ranking to rank a set of responses, output from different candidate models 200, for a given prompt. The overall rankings can then be used to calculate a target performance score for each candidate model's response. However, the target performance score can be otherwise manually determined.

In a second variant of S110, target performance scores can be received from a third party (e.g., a set of prompt-response-score groupings received from a third party database).

In a third variant of S110, the target performance scores can be determined by a set of reward model 300 (e.g., evaluation model, judge model), wherein the reward models 300 score training prompt-response pairs (e.g., prompt-response pairs generated for new candidate models 200, prompt-response pairs for new prompts or new responses, etc.). In an embodiment, a reward model 300 can use pairwise ranking to rank a set of responses, output from different candidate models 200, for a given prompt. The overall rankings can then be used to calculate a performance score for each candidate model's response. The set of reward models 300 can include one or more reward models 300.

In a fourth variant of S110, target performance scores can be generated from user metrics received from the user and/or generated from indicators relating to the user. In this variant, the user metrics can be used to evaluate a result determined in S300 (e.g., a response from the selected model 210, etc.). In an example, when a user metric indicates that a result was poor quality, the reward model can generate a performance score from the prompt-response pair and penalize it based on the user metric. In another example, in the similarity variant of the router, the stored prompt representation associated with the selected prompt representation-candidate model pair can be determined, and the performance score associated with the stored prompt representation can be decreased. However, user metrics can otherwise be used to generate target performance scores for training and/or retraining the router 100.

However, target performance scores can be determined by any other suitable entity.

Target performance scores can be determined in any suitable number at a time. In variants, S110 can include determining a single target performance score or multiple target performance scores to describe a prompt-response pair. The multiple performance scores can include performance scores of similar or different types. The multiple performance scores can be determined by the same or different entity (e.g., different reward models, different users, etc.) In variants, S110 can include aggregating multiple performance scores into a single performance score (e.g., by averaging multiple performance scores, taking a maximum performance score, etc.). Aggregation of multiple performance scores can be based on a set of user preferences. In an example, a user preference is a weight assigned to each type of performance score such that some performance scores are weighted more heavily when determining an overall aggregated performance score. In variants, the multiple performance scores and/or aggregated performance scores can be assigned to the prompt-response pair.

However, determining training data S100 can otherwise be performed.

Determining a router S200 functions to configure the router 100 based on the training data. Determining a router 100 is preferably performed after S100 and before S300 but can alternatively be performed concurrently with or after S300 (e.g., when adding a new model to an existing router S210 is performed). S200 can include refining an existing router 100 or creating a new router 100. S200 can be performed for a single router 100 or multiple routers 100 (e.g., a multi-router System). S200 can include determining a router 100 through prompt comparison or prompt prediction.

In a first variant, the router 100 is the first variant of the router 100 (e.g., the router 100 uses a similarity model 111). In this variant, S200 can include training an encoder 20 to encode prompts, prompt-model pairs, and/or any other encoding object. In various embodiments of this variant, S200 can function to define a latent space based on the training prompts and/or train an encoder to encode the training prompts within the latent space. The encoder 20 (e.g., integrated within the similarity model 11 and/or separate from the similarity model 11) can be trained on training prompts (e.g., so that the distribution of encoder 20 training matches the distribution of runtime inputs) and/or any other suitable distribution of prompts. S200 can optionally additionally include encoding the training prompts and/or another set of prompts within a prompt-performance score pair and storing the resulting encodings (e.g., prompt representations) as stored prompt representations. Alternatively, training prompts can be encoded at runtime.

In a first embodiment, the router 100 can store a prompt representation (e.g., training prompts and/or training prompt encodings) alongside a set of performance scores determined in S110. In a second embodiment, the router 100 can store a prompt representation alongside a response representation (e.g., training responses and/or training response encodings). In a third embodiment, the encoder 20 can ingest a prompt and a representation of a candidate model (e.g., parameters) to generate encodings, which are then stored. S200 can optionally include training models for determining similarity with learned architectures. For example, a GNN can be trained to represent a prompt and/or encoding thereof as a graph and to determine a similarity between the resulting graph and another graph. However, in the similarity variant, the router 100 can be otherwise trained.

In a second variant, the router 100 is the second variant of the router (e.g., the router 100 uses a score prediction model 112). In this variant, S200 can include training a score prediction model 112 (SPM) using the prompt-performance score pairs generated in S100. In this variant, the SPM can be trained end-to-end, or scoring layers can be trained individually, a subset of classifier heads of the SPM can be trained, a subset of scoring layers can be trained at a time, and/or the SPM can be trained in any other suitable way. In an end-to-end embodiment, the encoding layers and scoring layers are trained together (e.g., example shown in FIG. 7). In this embodiment, the training prompts, and optionally additional information (e.g., context, prompter identifier, etc.) can be used as the SPM training inputs, and the corresponding target performance score can be used as the training targets. The SPM can be refined (e.g., the SPM layer weights can be refined or updated) based on comparison (e.g., loss) between the predicted performance score for each candidate model and the respective target performance score (e.g., using backpropagation). In a first example, the set of training prompt-performance score pairs associated with a single training prompt are identified from the sets of training prompt-performance score pairs for each the set of candidate models 200, and the SPM is trained to output the performance score for the respective candidate model scoring head, given the training prompt (e.g., multiple scoring heads are concurrently trained). In this example, the encoding layers can also be trained. In a second example, the SPM is trained using a single training prompt-performance score pair associated with a candidate model, wherein only the shared encoding layer and the scoring head for the candidate model are trained. However, any other set of layers can be trained serially or in parallel.

Figure 9A:
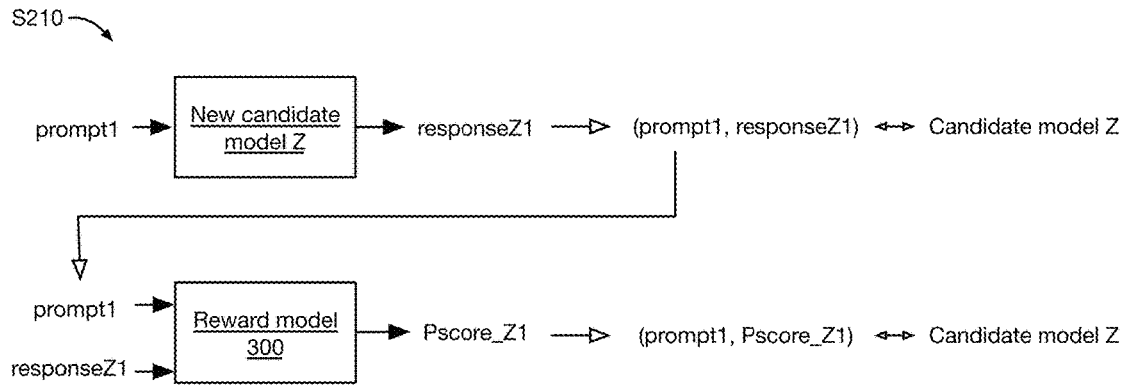
FIG. 9A is a schematic representation of a variant of S210.
Figure 9B:
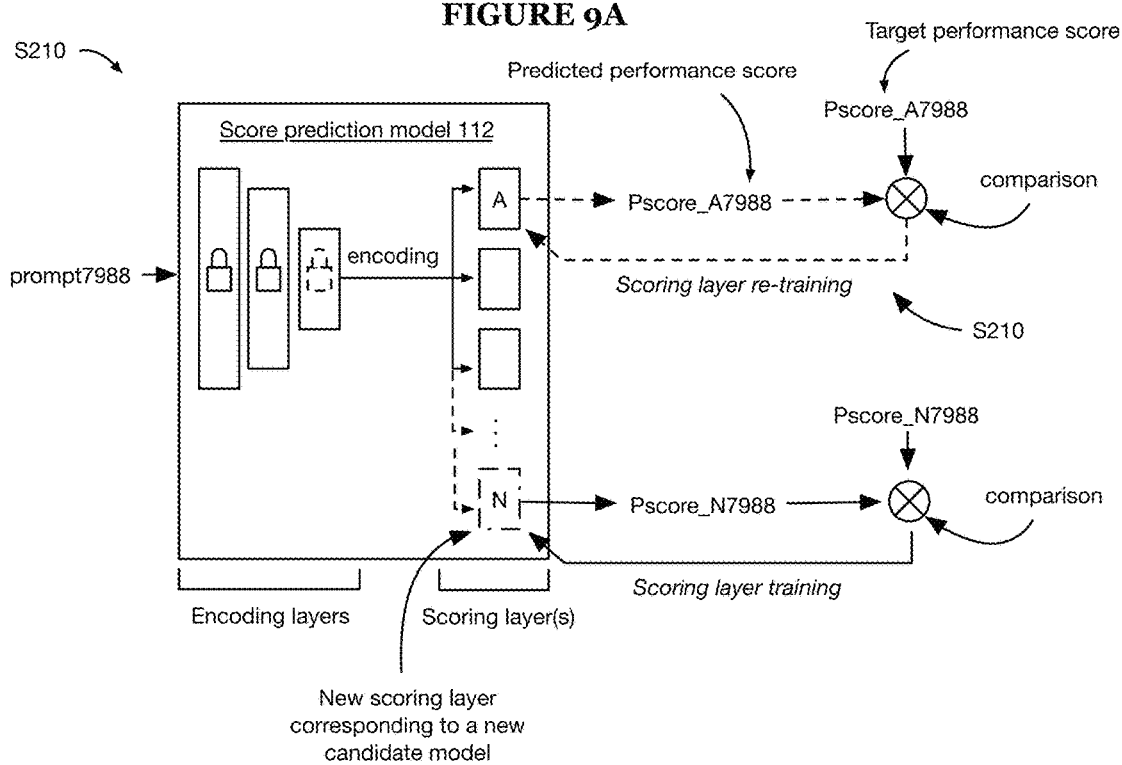
FIG. 9B is an illustrative example of a variant of S210.

In a second variant, different layers of the SPM (e.g., the encoding layers and scoring layers, different subsets of the encoding layers, etc.) can be trained separately. This variant can be used: to train the initial SPM, to add a new set of scoring layers to the SPM (e.g., to add a new candidate model to the system), after a condition is met (e.g., after a threshold number of new candidate models have been added since the last encoding layer retraining), and/or used at any other time. In a first embodiment, an encoder 20 is extracted from a SPM that was trained end-to-end (e.g., using the first variant of S200), wherein the scoring layers are individually trained to predict the performance score for their respective candidate models based on a prompt encoding, for the paired training prompt, that is extracted by the pretrained encoder 20 (e.g., example shown in FIG. 9B). For example, a scoring head of the SPM is trained to predict target performance scores, for a candidate model, that are paired with prompt embeddings output by the (shared) pretrained encoding layers. In a second embodiment, the encoder 20 is an encoder 20 from an autoencoder (e.g., encoder-decoder), wherein the autoencoder is trained to embed a prompt into a latent space, then decode the prompt encoding (in the latent space) into a target prompt (e.g., in a different language, a set of concepts, etc.). The scoring heads are then individually trained to predict the performance score for the respective candidate model based on the prompt encoding output by the encoder 20. In a third embodiment, a subset of the encoding layers (e.g., last L layers, etc.) are trained (e.g., updated) when training a new scoring head and/or updating a pretrained scoring head. This embodiment can enable the encoding layers to learn additional prompt features that can be relevant to response performance score prediction. In this embodiment, the other scoring heads can optionally be retrained to predict the performance score for their respective candidate models, based on the new prompt encoding generated by the updated encoding layers for a prior training prompt.

However, the score prediction model 112 can be otherwise trained.

However, the router 100 can be otherwise trained.

Adding a model to an existing router S210 functions to expand a router's breadth to a new candidate model. S210 can determine prompt-response-performance score sets for the new candidate model using the methods described in S100 (e.g., example shown in FIG. 9A). The training prompts used to determine prompt-response-performance score sets for the new candidate model can be the same training prompts used to determine the existing router 100 or new training prompts. For example, S210 can include: running the training prompts (e.g., the same or different training prompts as in S105) through the new model, recording the responses returned by the new model, labeling the prompt-response pairs with a performance score (e.g., manually, using the reward model 300, etc.), and associating the performance score with the training prompt of the training prompt-response pair.

All or portions of the router 100 can then be retrained based on the prompt-performance score pairs for the new model. When using new training prompts, the new training prompts can optionally be additionally run on existing candidate models within the set of candidate models 200 for which the router 100 was configured. In multi-router variants, all routers 100 can be updated, a subset of routers 100 can be updated, one router 100 can be updated, or no routers 100 can be updated to accommodate the new model. In a first variant, a router 100 is retrained to include a new model only if the new model is specific to a domain and/or modality not represented by candidate models in the router's set of candidate models 200 (e.g., ascertained using metadata associated with the new model). In a second variant, a router 100 is retrained to include a new model only if it exhibits superior performance (e.g., higher performance scores) than a threshold number of existing candidate models 200 on the same prompt or set of prompts. Alternatively, a router 100 is retrained to include a new model only if the performance improvement over existing candidate models exceeds a predetermined threshold. In a third variant, the router 100 is retrained to include a candidate model responsive to a user instruction (e.g., a received instruction from a user for whom the router 100 is tailored). In a fourth variant, the router 100 is retrained to include all new candidate models. However, the router 100 can retrain according to any other suitable condition.

In the first variant of the router 100, the router 100 uses prompt comparison. In this variant, adding a model to the router 100 can optionally include encoding and/or storing information about the new model (e.g., a model reference, model constraints, model parameters, model hyperparameters, etc.) with the prompt embeddings. Alternatively adding a model to the router 100 can include storing prompt representations corresponding to prompts run on the new model alongside performance scores of the prompts run on the new model determined through any of the methods described in S100. However, adding a new model to an existing prompt comparison router 100 can be otherwise performed.

In the second variant of the router 100, the router 100 uses score prediction. In this variant, the score prediction model 112 is preferably updated using one or more methods described in S100 using the training prompt-performance score training data for the new candidate model, but can be otherwise updated. A new scoring head is preferably trained for the new model; alternatively, the entire SPM is retrained to add the new model. The new scoring head can be a clone of another scoring head (e.g., a scoring head for a similar model), a clone of a template head with default weights, and/or otherwise configured. Training (e.g., learning weights) can include training the scoring head only (e.g., using the prompt encodings for the training prompt output by the pretrained encoding layers), retraining all or a subset of the encoding layers, retraining all or a subset of the other scoring heads (e.g., using the corresponding target performance scores for each scoring head for each prompt; example shown in FIG. 9B), and/or retraining any other portion of the SPM. However, adding a new model to an existing score prediction router 100 can be otherwise performed.

In an embodiment, S210 is performed by generating a new generated program corresponding to the model using the methods described in step "S300" of U.S. application Ser. No. 18/800,731 filed 12-August 2024 and titled A METHOD FOR CONVERTING MODELS TO PROGRAMS, incorporated herein in its entirety by this reference, which claims the benefit of U.S. Provisional Application No. 63/532,206, filed 11 Aug. 2023, U.S. Provisional Application No. 63/588,611, filed 6 Oct. 2023, and U.S. Provisional Application No. 63/598,779 filed 14 Nov. 2023, each incorporated herein in its entirety by this reference. In this embodiment, the new generated program is stored alongside previously-determined generated program without changing the existing programs; alternatively, the existing programs can be modified.

However, S210 can be otherwise performed.

In variants, S200 can optionally include selecting a router 100 for runtime (e.g., for use in S300). This can include: generating a set of candidate routers, determining a router metric for each candidate router, and selecting a router 100 based on the router metric. The candidate routers can vary in: model architecture (e.g., layers, weights, etc.; be a DNN, CNN, KNN, SVM, regression, etc.; use a custom prompt encoder or a third party prompt encoder such as Word2vec, etc.); training hyperparameters; training methodology; training data (e.g., different prompt-performance score pairs); and/or otherwise vary.

Figure 12:
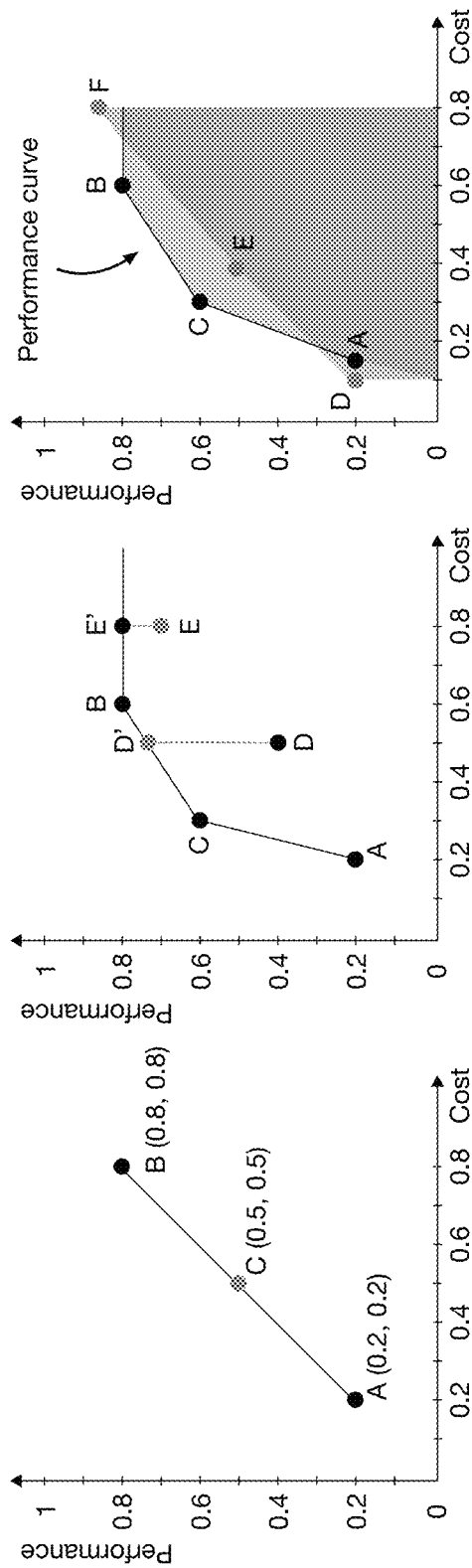
FIG. 12 is an illustrative example of a variant of a performance curve. The left graph in FIG. 12 shows linear interpolation, which is the process of achieving the cost-performace trade-off between any concrete routers. Point A and B are routers with different input parameters. To achieve the average of A and B, we build router C which routes to A or B with 50% probability each, and it performs the average of A and B in expectation. The middle graph in FIG. 12 considers points A to E, we can construct the non-decreasing convex hull consisting of points A, B, and C. D and E as they can be replaced by strictly superior affine combination of A, B, and C. The right graph in FIG. 12 shows ABC and DEF are two routing systems (already convexified with the ABC extrapolated to (0.1,0) for a fair comparison). To compare, we interpolate A and B to $c_{min}=0.1$ and $c_{max}=0.8$, respectively, then calculate the area under the curve normalized by $c_{max}-c_{min}$ to derive AIQ.

In this variant, the router 100 can be selected during S200 (e.g., before runtime prompts are received), during S300 (e.g., when a runtime prompt is received), or at any other time. The router metric can include: an average improvement in quality (AIQ) computed by averaging the performance of the routing system at different cost levels (e.g., by taking the area under a performance-cost routing curve); a metric calculated by taking the area under a performance-latency routing curve; a metric calculated by taking the area under a performance-latency-cost routing curve; the performance of the router 100 (e.g., determined based on the performance scores of the models selected by the router 100 for a set of prompts); and/or any other router metric. In an example, the router metric can be based on a performance curve. The performance curve can be determined by plotting measurements of router outputs (e.g., metrics determined for prompt-response pairs) representing competing goals, then generating a curve (e.g., a non-decreasing convex hull) based on the plot (e.g., example shown in FIG. 12). In an example, a performance curve represents the change in a performance score as monetary cost increases. The router 100 with the highest metric is preferably selected; alternatively, the router 100 with the lowest metric or other metric can be selected for use in S300.

In a first variant, the router 100 is selected by selecting a router 100 $R_\theta$ with a highest area under the respective router 100 performance curve.

In a second variant, the router 100 is selected by selecting a router 100 with a highest area under the respective router 100 performance curve normalized by a range in a cost (and/or any other performance curve axis, including latency) given by equations 1 and 2.

$$\text{range} = c_{max} - c_{min} \quad \text{(Equation 1)}$$

$$AIQ(R_\theta) = \frac{1}{\text{range}} \int_{c_{min}}^{c_{max}} P_{R_\theta} dc \quad \text{(Equation 2)}$$

In a third variant, the router 100 is selected by selecting the highest-performing router 100 at a predefined cost (e.g., a user preference specifying a maximum allowable cost, etc.). However, selecting a router can be otherwise performed.

However, the router can otherwise be selected.

However, S200 can be otherwise performed.

Using the router S300 functions to select a candidate model for use on a runtime prompt. S300 can include receiving a runtime prompt S310, optionally determining metadata S320, determining performance scores S330, selecting a candidate model S340, and/or optionally determining a response S350. S300 can be performed responsive to receiving the runtime prompt and/or at any other suitable time.

Receiving a runtime prompt S310 functions to receive a runtime prompt from a prompter 10 (e.g., a service, a user, a user device, etc.). The prompter 10 can be a third party, another system component, and/or another suitable entity. A runtime prompt can be modified (e.g., translated, grammatically corrected, tagged, encoded, changed in data type, PII-removed, etc.) or unmodified before being passed into the router 100. A runtime prompt can be received as part of a query or can be otherwise received. A runtime prompt can be received from a user, an API call, a third party system, or any other suitable source. A runtime prompt can be received alone or in association with a set of selection parameters. Additionally or alternatively, the runtime prompt can be received (e.g., from a prompter 10) in association with a reference to a set of user preferences. The runtime prompt can be automatically generated (e.g., synthetic), user-input, and/or can be otherwise originated. In a variant, the runtime prompt can be an encoding of a runtime prompt, wherein the latent space of the encoder 20 is unknown to the router 100 (e.g., the encoder 20 is a third party). In this variant, the stored prompt representations 400 can preferably also be within the same latent space as the runtime prompt. In this variant, a routing can be determined without knowing the contents of the runtime prompt. However, S310 can be otherwise performed.

Optionally determining metadata S320 functions to estimate metadata related to usage of a candidate model on a runtime prompt. S320 is preferably performed by a metadata model 30. S320 can include determining metadata before the router 100 is run on the runtime prompt, between selection of the candidate model and running of the candidate model, after the candidate model runs, and/or at any other suitable time.

In a first variant, S320 can include receiving metadata from a third party. The third party can be a provider running a candidate model, a user device, a model evaluator, and/or another suitable third party. In a first example of this variant, S320 can include sending information about a runtime prompt (e.g., a prompt, prompt encoding, prompt classification, prompt existence, etc.) to a candidate model provider and receiving a metadata quote (e.g., estimated or actual) in return. In a second example of this variant, S320 can include iteratively receiving metadata about the candidate model provider (e.g., wherein S320 is performed asynchronously with other steps of the method).

In a second variant, S320 can include determining metadata locally. In a first example of this variant, S320 can be performed by a metadata model 30. The metadata model 30 can have the same architecture as the score prediction model 112, similarity model 111, and/or other system model, or have another architecture. In a second example, S320 can include retrieving a known piece of metadata from a local database. In a third example of this variant, S320 can include calculating metadata based on a candidate model-specific ruleset and information about a prompt. For example, given a known per-token cost for running a particular candidate model, the monetary cost for running that candidate model can be determined as a linear function of runtime prompt token count. S320 can preferably be performed responsive to S310 but can alternatively be performed at any other suitable time. However, determining metadata S320 can be otherwise performed.

Determining performance scores S330 functions to determine a performance score for each candidate model in the set of candidate models 200 given a runtime prompt. S330 is preferably performed by the router 100 but can alternatively be performed by another system component. Performance scores can be determined for all candidate models 200 but can alternatively be determined for a subset of candidate models. In variants, S330 can be performed until a predicted score reaches a threshold target value, until a performance score has been determined for a threshold number of candidate models, and/or until another condition has been met.

In a first variant of S330, the router 100 is the first variant of the router (e.g., the router 100 uses a similarity model 111). In this variant, performance scores are stored alongside a candidate model or reference to a candidate model and are selected during S330 to determine a set of similar stored prompt representations 410. In this variant, S330 is preferably performed by the similarity model 111 but can alternatively be performed by another suitable system component. S330 can include determining a set of prompt encodings using a set of encoders 20 and selecting candidate models 200 based on the set of prompt encodings. A set of prompt encodings can include one or multiple prompt encodings. However, the set of prompt encodings can otherwise be configured. Optionally, the set of prompt encodings can be further encoded to determine a single prompt encoding.

The set of prompt encodings can be used to identify similar stored prompt representations 410. In a first example, similar prompt representations can be identified by identifying prior prompts (e.g., prompt representations for prompts previously input into a candidate model) with small distance metrics to the prompt encoding, wherein each prior prompt can be pre-associated with one or more candidate models, performance scores for each candidate model, and/or responses for each candidate model. Different prompts (prompt representations) can be associated with different candidate models. In a second example, similar stored prompt representations can be identified by, for each candidate model, comparing the set of prompt encodings to the stored prompt representation for the respective candidate model (e.g., determining a distance between the prompt encoding and the stored prompt representation) and/or using another suitable method. Alternatively, stored prompt representations are not aggregated per-candidate model. Distance can include cosine similarity, Mahalanobis distance, Euclidean distance, Chebyshev distance, Hamming distance, Jaccard distance, lexical similarity, BLEU, ROUGE, and/or any other suitable measurement of distance.

In a first embodiment, a distance between a prompt encoding and each stored prompt representation is used to determine a stored prompt representation similarity ranking, of which the N closest stored prompt representation and associated candidate models 200 are selected.

In a second embodiment, a set of distances between each of a set of prompt encodings and a stored prompt representation within the same latent space as the respective prompt encoding are calculated, and the set of distances are aggregated to determine an overall distance for the set of prompt encodings and a candidate model corresponding to the stored prompt representation. In an example of this embodiment, the set of distances are weighted by a set of user preferences specifying the relative importance of different latent spaces.

In a third embodiment, both distances and performance scores are considered when selecting a set of similar stored prompt representations 410 (e.g., distant high-performance score stored prompt are added to the set of similar stored prompt representations 410 while similarly-distant low-performance score stored prompt representations 400 are not).

In a fourth embodiment, the runtime prompt and candidate model (e.g., parameters of the candidate model, etc.) are encoded together, distances are determined between the resulting encoding and each stored prompt representation (e.g., wherein each stored prompt representation includes an encoding of a training prompt and a candidate model), and a set of similar stored prompt representations 410 are selected based on the distances.

In a fifth embodiment, a cluster of stored prompt representations is identified for a prompt encoding, and the cluster is selected as the set of similar stored prompt representations 410. However, the set of similar stored prompt representations 410 can be otherwise selected.

For each prompt representation in the set of similar stored prompt representations 410, a performance score can be determined. In a first example, the performance score is stored alongside a stored prompt representation and can be simply retrieved (e.g., wherein the stored performance score is used as the performance score). In a second example, the performance score is generated by the reward model 300, wherein the reward model 300 predicts the performance score based on the stored prompt representation and an associated stored response representation. In a third example, the performance score is determined by a score prediction model 112, wherein the score prediction model 112 determines the performance score based on the stored prompt representation as input. In a fourth example, the performance scores associated with each similar prompt representation are aggregated by candidate model (e.g., wherein the performance scores for a candidate model are aggregated together), wherein the performance score for the candidate model can be the aggregated score. The performance scores can be aggregated by using a weighted average (e.g., weighted based on the respective similar prompt representation distance from the runtime prompt representation), using a median, or otherwise aggregated. However, performance scores for similar stored prompt representations 410 can otherwise be determined. However, S330 for the first variant of the router 100 can otherwise be performed.

In a second variant of S330, the router 100 is the second variant of the router (e.g., the router 100 uses a score prediction model 112). In this variant, performance scores are predicted for each of a set of candidate models 200. In this variant, S330 is preferably performed by the score prediction model 112 or set of score prediction models 112 but can alternatively be performed by another suitable system component. S330 can include determining performance scores locally and/or receiving performance scores from a third party (e.g., where a score prediction model 112 for a candidate model is run by the candidate model provider). In a first embodiment, the runtime prompt is run through the SPM, wherein the runtime prompt is embedded into a prompt embedding, and each scoring head predicts a performance score for the candidate model associated with the respective scoring head based on the prompt embedding. The performance scores are preferably determined separately from the metadata, but can alternatively be determined alongside the metadata (e.g., S320 can be performed during S330). In a second embodiment, the performance score values from multiple S330 runs for the same runtime prompt can be aggregated (e.g., averaged, voted upon, etc.), wherein the aggregated performance score is used as the performance score for the candidate model. In a third embodiment, the SPM outputs a ranked list of candidate models 200 for the runtime prompt (e.g., wherein the SPM is trained to determine ranked lists of candidate models 200 given a runtime prompt). However, S330 for the second variant of the router 100 can otherwise be performed.

However, S330 can be otherwise performed.

Figure 10:
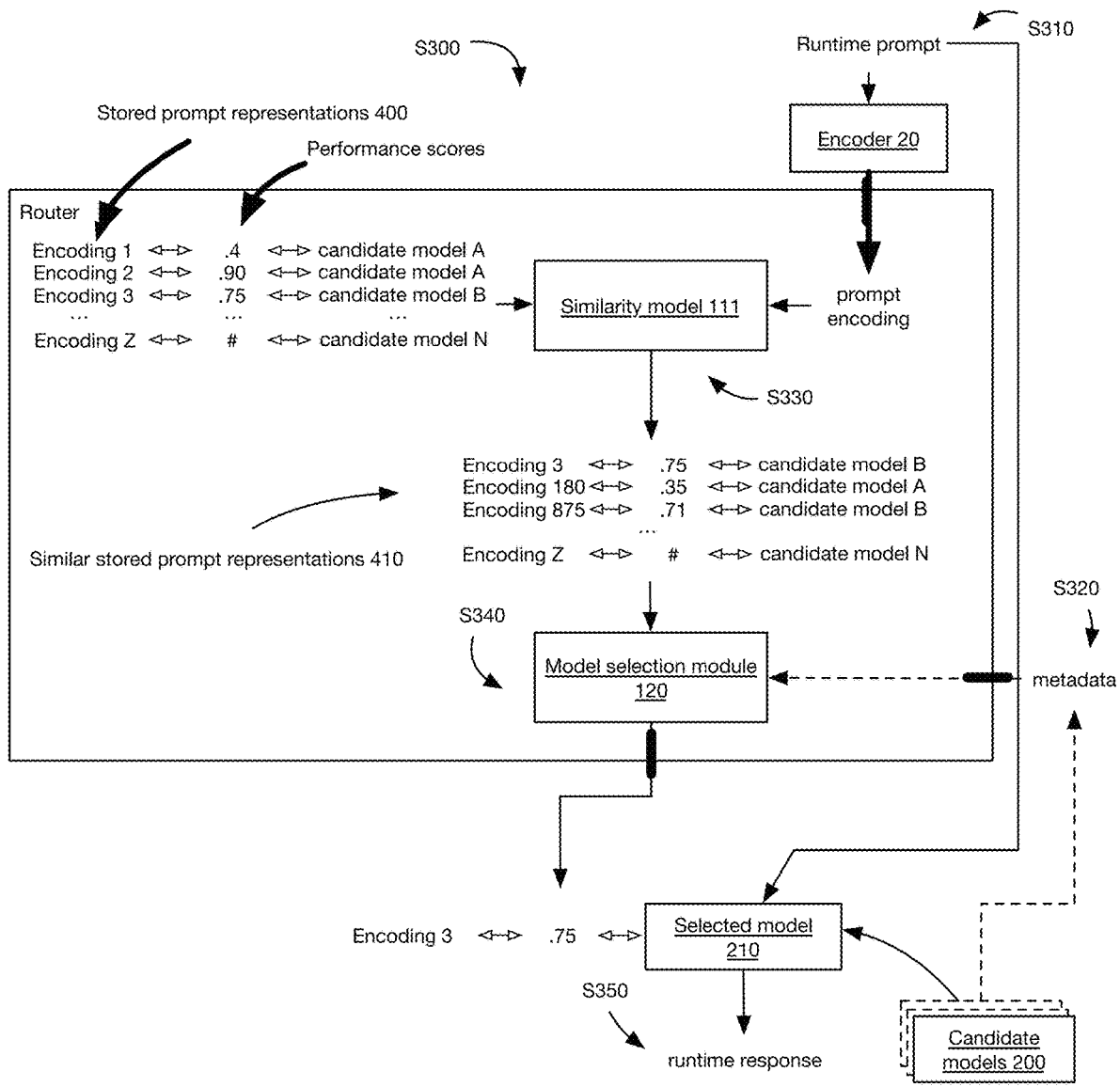
FIG. 10 is an illustrative example of a variant of the similarity model.

Selecting a candidate model S340 functions to identify the best candidate model to use to generate a response (e.g., wherein the best candidate model is the selected model 210). The candidate model can be selected from the set of candidate models corresponding to the set of similar stored prompt representations 410 (e.g., output from the first variant of the router 100; example shown in FIG. 10), from the overall set of candidate models 200 (e.g., for which the second variant of the router 100 determined a performance score), and/or from any other suitable set of candidate models 200. The candidate model can be selected based on: the determined performance score or set of performance scores (e.g., from S330), the determined metadata (e.g., from S320), selection parameters (e.g., user preferences), and/or any other suitable information. For example, the candidate model with the best predicted performance score (e.g., from S330) and a set of predicted metadata that satisfy the selection parameters (e.g., cost threshold, latency threshold, model preferences, etc.) can be selected. S340 is preferably performed by the model selection module 120 but can alternatively be performed by any other suitable system component. S340 preferably includes selecting a single candidate model but can alternatively include selecting multiple candidate models.

In variants of the router 100 without a model selection module 120, the performance scores, metadata, and/or selection parameters can be sent to a user device or other third party without selecting any particular candidate model as optimal and can receive a selection in return (e.g., a selection determined manually or automatically a third party).

In a first variant, a candidate model is selected based on being associated with a highest performance score while satisfying a set of constraints and/or selection parameters. In examples, the candidate models and associated performance scores can be aggregated from the prompt representations within the cluster, and used to determine the selected model.

In a second variant, a candidate model can be selected using an optimization of various metrics (e.g., performance scores and/or metadata, etc.). In examples, the optimization can use a multi-objective optimization, a weighted scoring, constraint-based optimization (e.g., using a Langrangian), decision trees, ML models, linear programming, and/or any other suitable type of optimization method. In a specific example, the optimization is an optimization of cost, latency, and accuracy, wherein cost, latency and accuracy are weighted by user-specific selection parameters defining each metric's relative importance to the user. In another specific example, a set of metrics (e.g., performance scores and/or metadata) for each candidate model are aggregated (e.g., using a weighted average weighted by selection parameters) to determine an aggregate metric for the respective candidate model, then a candidate model is selected based on the aggregate performance metric meeting a condition. In a third specific example, a set of performance scores for a model, each performance score determined by a different iteration of S330 (e.g., by different score prediction models 112, etc.) are weighted differently based on user-specific selection parameters to determine an overall performance score, and the selection module selects a candidate model based on the overall performance score. However, a candidate model can otherwise be selected by combining various metrics.

In a third variant, in variants where the router 100 uses a similarity model 111, the candidate model associated with the most similar stored prompt representation can be used (e.g., even if the performance score associated with the candidate model is not the highest known performance score for a similar prompt).

In a fourth variant, in variants where the router 100 uses a similarity model 111, the candidate model which is highest-performing (e.g., based on one or multiple metrics) for a cluster of stored prompt representations 400 can be selected.

In a fifth variant, in variants, where the router 100 uses a similarity model 111, the candidate model which is highest-performing for a median stored prompt representation within a cluster of stored prompt representations 400 can be selected.

However, a candidate model can be otherwise selected.

S340 can optionally additionally include determining model settings (e.g., response token counts, conditional inputs, context parameters, etc.) for the model. In a first example, a model is selected, then model settings for the model are determined based on the model. In a second example, the model settings are determined alongside the model. However, model settings parameters can otherwise be determined.

However, S340 can be otherwise performed.

Figure 14A:
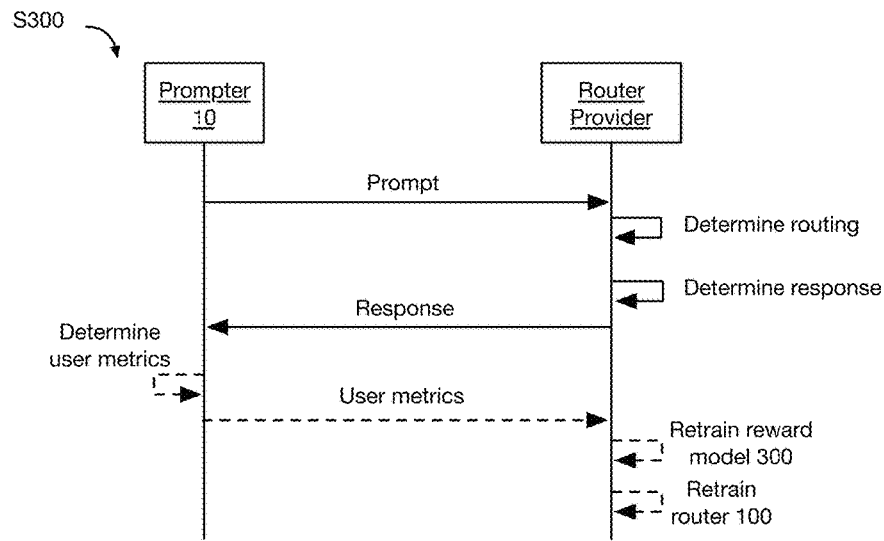
FIGS. 14A-14C are schematic representations of examples of S300.
Figure 14B:
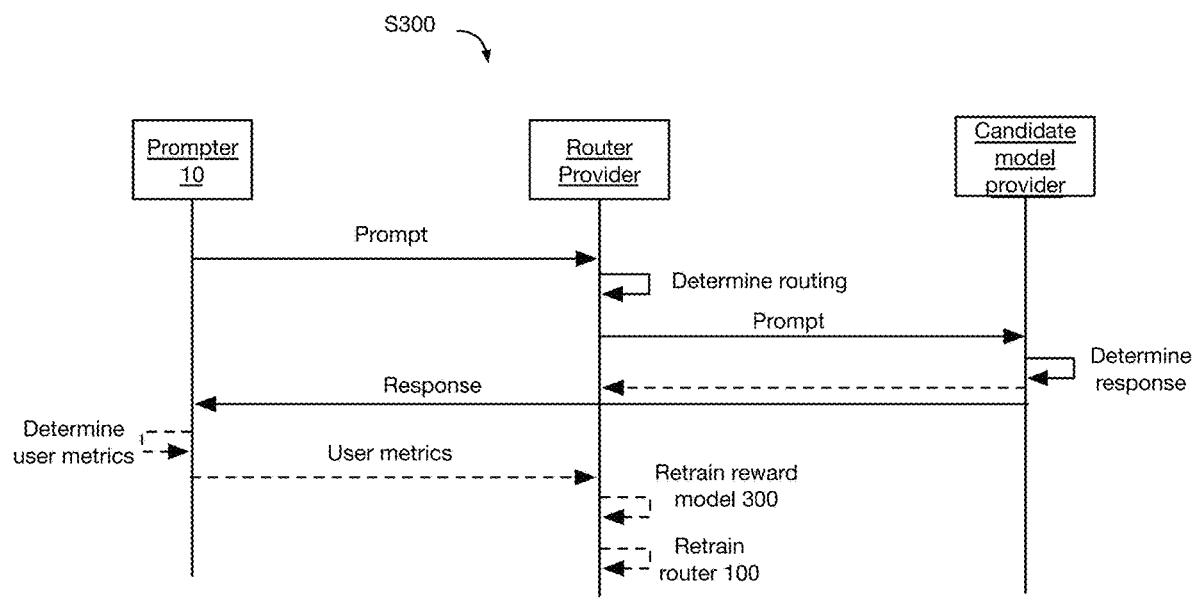
Figure 14C:
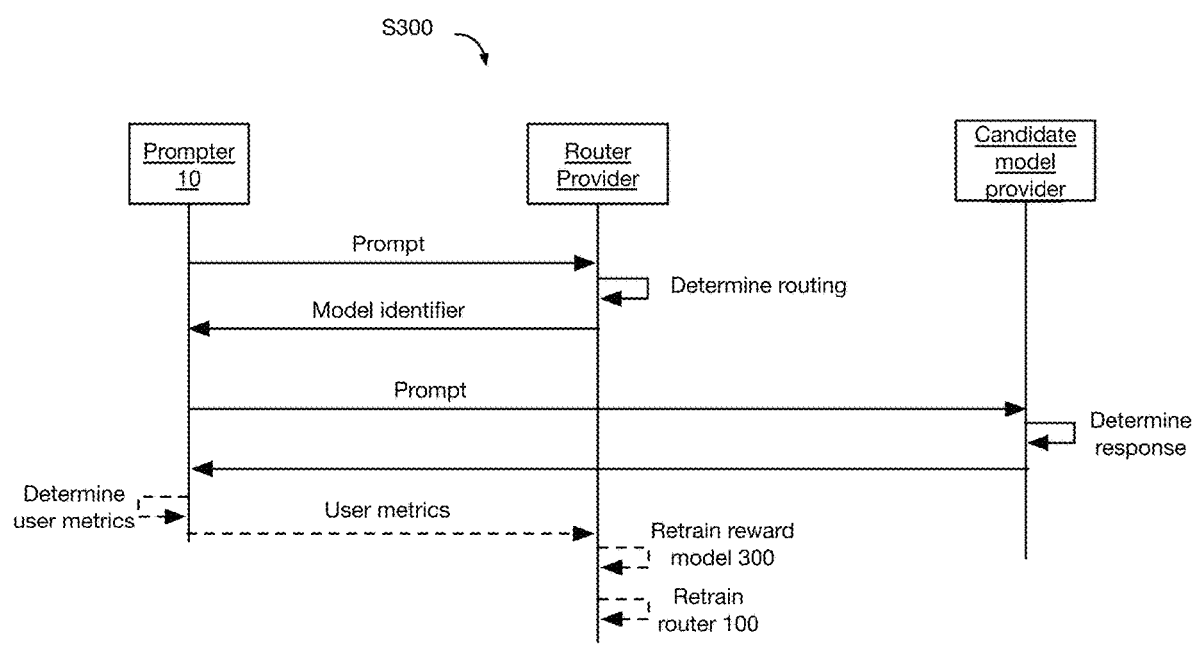

Determining a response S350 functions to route the runtime prompt to a selected model 210 (e.g., the model selected in S340). The runtime prompt is preferably run on the one selected candidate model but can additionally or alternatively be run on more than one selected model 210, or no model. S350 can be performed by the user, the prompting entity, the system, the router 100, and/or by any other suitable component. S350 can be performed: immediately after selecting the model (e.g., S340); at a scheduled time (e.g., selected by the user, determined based on estimated load on the selected model, etc.); and/or at any other time. The runtime prompt can be run on a selected model 210 or a set of selected models 210 once or more than once. In the latter variant, a final response can be determined from multiple responses using a model selector, a set of rules, user input, a heuristic, a transformer model, a metric applied to the determined responses from each iteration, and/or otherwise selected. In variants, additional information (e.g., context, prompter information, etc.) can be passed to the selected model 210 (e.g., supplemental information, model settings, contextual information, etc.). In a first variant, the system performing S340 can transmit the runtime prompt to a candidate model provider via an API and/or another connection (e.g., example shown in FIG. 14B). In a second variant, the router 100 can run the runtime prompt on a selected locally running model (e.g., example shown in FIG. 14A). In a third variant, the system performing S350 can instruct the user to send the runtime prompt to a selected model 210 (e.g., by returning the model identifier to the user; example shown in FIG. 14C). In a fourth variant, the router 100 can send a clone of a selected candidate model (e.g., the model parameters) to a prompter 10 or other suitable entity. However, the runtime prompt can be otherwise run. In an embodiment, the router 100 can optionally determine whether to run the prompt on the candidate model or to run the prompt on a generated program equivalent of the candidate model, generated using the method described in U.S. application Ser. No. 18/800,731 filed 12-August 2024 and titled A METHOD FOR CONVERTING MODELS TO PROGRAMS, incorporated herein in its entirety by this reference, which claims the benefit of U.S. Provisional Application No. 63/532,206, filed 11 Aug. 2023, U.S. Provisional Application No. 63/588,611, filed 6 Oct. 2023, and U.S. Provisional Application No. 63/598,779 filed 14 Nov. 2023, each incorporated herein in its entirety by this reference.

A result can optionally be returned to the prompter 10 (e.g., directly, via the system, etc.). A result can include a response from the selected candidate model, an identifier for a selected candidate model, a set of ranked candidate models 200, a message (e.g., "no suitable model could be found"), predicted performance scores, performance scores determined from the reward model 300, metadata, and/or other suitable information or combination of information. In an example, a runtime response is received from the candidate model provider and is relayed to the prompter 10. Alternatively, no result can be returned to a prompter 10. The result can be sent to a prompter 10, to an entity specified by the prompter 10, or to another suitable entity or set of entities. The result can be additionally stored and used as training data for the reward model 300 and/or SPM. In variants, the result can be otherwise returned.

However, S350 can be otherwise performed.

However, S300 can be otherwise performed.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

However, the method can be otherwise performed.

As a person skilled in the art will recognize from the previous detailed description and from the figures and claims, modifications and changes can be made to the preferred embodiments of the invention without departing from the scope of this invention defined in the following claims.

We claim:

1. A method for routing machine learning model prompts, comprising:
    training a scoring model comprising a neural network to predict candidate model response scores based on neural network prompts;
    extracting an encoder from the scoring model, wherein the encoder is a strict subset of layers of the scoring model;
    receiving a prompt;
    determining a candidate model response score for each of a set of candidate models based on the prompt, by:
        determining a prompt encoding from the prompt using the encoder extracted from the scoring model; and
        determining the candidate model scores based on the prompt encoding;
    selecting a runtime model from the set of candidate models based on the set of candidate model response scores; and
    facilitating runtime model response determination for the prompt using the runtime model.

2. The method of claim 1, wherein the runtime model is selected before the prompt is run through any of the set of candidate models.

3. The method of claim 1, wherein determining the candidate model response scores comprises:
   determining a set of stored encodings generated using the encoder, wherein each stored encoding is associated with a stored prompt; and
   comparing the prompt encoding to the set of stored encodings.

4. The method of claim 3, wherein determining the candidate model response scores further comprises:
   determining a set of similar encodings to the prompt encoding from the set of stored encodings based on the comparison; and
   using response scores associated with the set of similar encodings as the candidate model response scores.

5. The method of claim 4, wherein the set of similar encodings is determined using cosine similarity.

6. The method of claim 1, further comprising determining a set of Quality of Service (QoS) metrics for each candidate model, and wherein selecting the runtime model comprises a multivariate optimization of candidate model response scores and QoS metrics.

7. The method of claim 6, wherein each set of QoS metrics is determined based on the prompt.

8. The method of claim 6, wherein a QoS metric within each set of QoS metrics comprises a resource allocation.

9. The method of claim 1, wherein the scoring model is trained by:
   determining a set of multiple performance scores for a prompt-response pair, wherein each performance score is determined by a different reward model;
   determining a target performance score from the set of multiple performance scores; and
   training the scoring model to predict the target performance score given the prompt in the prompt-response pair.

10. The method of claim 1, wherein each candidate model is associated with multiple candidate model response scores, wherein the runtime model is selected using the multiple candidate response scores for each of the set of candidate models.

11. The method of claim 1, wherein the prompt is received from a third party.

12. The method of claim 11, further comprising: receiving a set of operation metric preferences from the third party, wherein the runtime model is selected based on the operation metric preferences, wherein the operation metric preferences comprise at least one of latency, cost, or computational efficiency.

13. A method for model routing, comprising:
   training a routing model comprising a neural network to predict response scores for candidate models based on a prompt, wherein the routing model is trained based on:
      a set of prompts within a set of training prompt-response pairs, each training response determined using a candidate model within a set of candidate models; and
      a set of training response scores, each training response score evaluating a training prompt-response pair from the set of training prompt-response pairs;
   extracting an encoder from the routing model, wherein the encoder is a strict subset of layers of the routing model;
   receiving a new prompt from a user;
   determining a response score for each candidate model within the set of candidate models based on the new prompt by:
      determining a prompt encoding of the new prompt using the encoder extracted from the routing model: and
      non-probabilistically determining the response scores for the candidate models using the prompt encoding;
   selecting a runtime model from the set of candidate models for the new prompt based on the response scores; and
   facilitating determination of a response to the new prompt using the selected runtime model, wherein the response is returned to the user.

14. The method of claim 13, wherein each training response score in the set of training response scores is determined by a reward model, and wherein the method further comprises:
   after facilitating determination of the response, receiving a response evaluation from the user; and
   retraining the reward model using the response evaluation.

15. The method of claim 13, wherein the training response scores are generated by a scoring model trained to determine training response scores for training prompt-response pairs.

16. The method of claim 13, wherein each predicted response score comprises a continuous value.

17. The method of claim 13, wherein the routing model is part of a plurality of routing models, the method further comprising determining a plurality of response scores for each candidate model, wherein each response score in the plurality of response scores is determined by a different routing model; wherein the runtime model is selected based on the plurality of response scores for the runtime model.

18. The method of claim 13, further comprising:
   receiving a set of operational metric constraints from the user; and
   predicting a set of operational metrics for each candidate model;
   wherein the runtime model is further selected based on the predicted set of operational metrics satisfying the set of operational metric constraints.

19. The method of claim 13, wherein facilitating determination of the response comprises transmitting the new prompt to a third party hosting the selected runtime model, after selecting the runtime model.

20. The method of claim 13, wherein selecting the runtime model comprises:
   identifying a subset of the set of training prompt-response pairs that are similar to the new prompt, using the routing model; and
   selecting the runtime model using a heuristic applied to the training response score for each of the subset of training prompt-response pairs.

* * * * *

UNITED STATES PATENT AND TRADEMARK OFFICE
CERTIFICATE OF CORRECTION

PATENT NO. : 12,314,825 B2
APPLICATION NO. : 18/800900
DATED : May 27, 2025
INVENTOR(S) : Upadhyay et al.

It is certified that error appears in the above-identified patent and that said Letters Patent is hereby corrected as shown below:

In the Claims

Column 34, Line 8, In Claim 13, delete "model:" and insert --model;-- therefor

Signed and Sealed this
First Day of July, 2025

Coke Morgan Stewart
*Acting Director of the United States Patent and Trademark Office*